US010521705B2

(12) United States Patent
Lu et al.

(10) Patent No.: US 10,521,705 B2
(45) Date of Patent: Dec. 31, 2019

(54) AUTOMATICALLY SELECTING IMAGES USING MULTICONTEXT AWARE RATINGS

(71) Applicant: Adobe Inc., San Jose, CA (US)

(72) Inventors: Xin Lu, Mountain View, CA (US); Zejun Huang, Santa Clara, CA (US); Jen-Chan Jeff Chien, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 139 days.

(21) Appl. No.: 15/812,695

(22) Filed: Nov. 14, 2017

(65) Prior Publication Data

US 2019/0147305 A1  May 16, 2019

(51) Int. Cl.
*G06K 9/72* (2006.01)
*G06K 9/62* (2006.01)
*G06K 9/00* (2006.01)
*H04N 1/21* (2006.01)
*G06F 16/532* (2019.01)
*G06F 16/583* (2019.01)

(52) U.S. Cl.
CPC ............ *G06K 9/72* (2013.01); *G06F 16/532* (2019.01); *G06F 16/583* (2019.01); *G06K 9/00288* (2013.01); *G06K 9/6256* (2013.01); *G06K 9/6277* (2013.01); *H04N 1/215* (2013.01); *H04N 1/2145* (2013.01); *H04N 2201/0084* (2013.01)

(58) Field of Classification Search
None
See application file for complete search history.

(56) References Cited

U.S. PATENT DOCUMENTS

| 7,742,641 B2* | 6/2010 | Ivanov | G06K 9/6293 |
| | | | 382/190 |
| 8,370,282 B1* | 2/2013 | Leung | G06K 9/6263 |
| | | | 706/20 |

(Continued)

OTHER PUBLICATIONS

Ao, Yueying, Ran He, and Kaiqi Huang. "Deep aesthetic quality assessment with semantic information." IEEE Transactions on Image Processing 26.3 (2016): (Year: 2016).*

(Continued)

*Primary Examiner* — Andrae S Allison
(74) *Attorney, Agent, or Firm* — Keller Jolley Preece

(57) ABSTRACT

The present disclosure is directed toward systems, methods, and non-transitory computer readable media that automatically select an image from a plurality of images based on the multi-context aware rating of the image. In particular, systems described herein can generate a plurality of probability context scores for an image. Moreover, the disclosed systems can generate a plurality of context-specific scores for an image. Utilizing each of the probability context scores and each of the corresponding context-specific scores for an image, the disclosed systems can generate a multi-context aware rating for the image. Thereafter, the disclosed systems can select an image from the plurality of images with the highest multi-context aware rating for delivery to the user. The disclosed system can utilize one or more neural networks to both generate the probability context scores for an image and to generate the context-specific scores for an image.

20 Claims, 12 Drawing Sheets

(56) References Cited

U.S. PATENT DOCUMENTS

| | | | |
|---|---|---|---|
| 8,391,618 B1* | 3/2013 | Chuang | G06K 9/00664 |
| | | | 382/224 |
| 9,613,058 B2 | 4/2017 | Shen et al. | |
| 10,127,659 B2* | 11/2018 | Hsieh | G06F 19/00 |
| 2008/0016016 A1* | 1/2008 | Mitarai | G06K 9/00288 |
| | | | 706/25 |
| 2011/0075930 A1* | 3/2011 | Cerosaletti | G06K 9/00677 |
| | | | 382/190 |
| 2014/0278738 A1* | 9/2014 | Feit | G06Q 30/0201 |
| | | | 705/7.29 |
| 2015/0071547 A1* | 3/2015 | Keating | G06K 9/46 |
| | | | 382/195 |
| 2016/0070962 A1* | 3/2016 | Shetty | G06F 16/7834 |
| | | | 382/225 |
| 2018/0137390 A1* | 5/2018 | Brundage | G06K 9/00624 |

OTHER PUBLICATIONS

Lu, Xin, et al. "Deep multi-patch aggregation network for image style, aesthetics, and quality estimation." Proceedings of the IEEE International Conference on Computer Vision. 2015. (Year: 2015).*

Jina, X., Le Wua, Z. H., Chena, S., Chib, J., Pengb, S., Lia, X., & Gec, S. Efficient Deep Aesthetic Image Classification using Connected Local and Global Features, Aug. 2017, <https://pdfs.semanticscholar.org/a28d/84056650fa633d8be6c4e5a655251b080f50.pdf> (Year: 2017).*

Kao, Yueying, Ran He, and Kaiqi Huang. "Visual aesthetic quality assessment with multi-task deep learning." arXiv preprint arXiv:1604.04970 5 (2016). (Year: 2016).*

\* cited by examiner

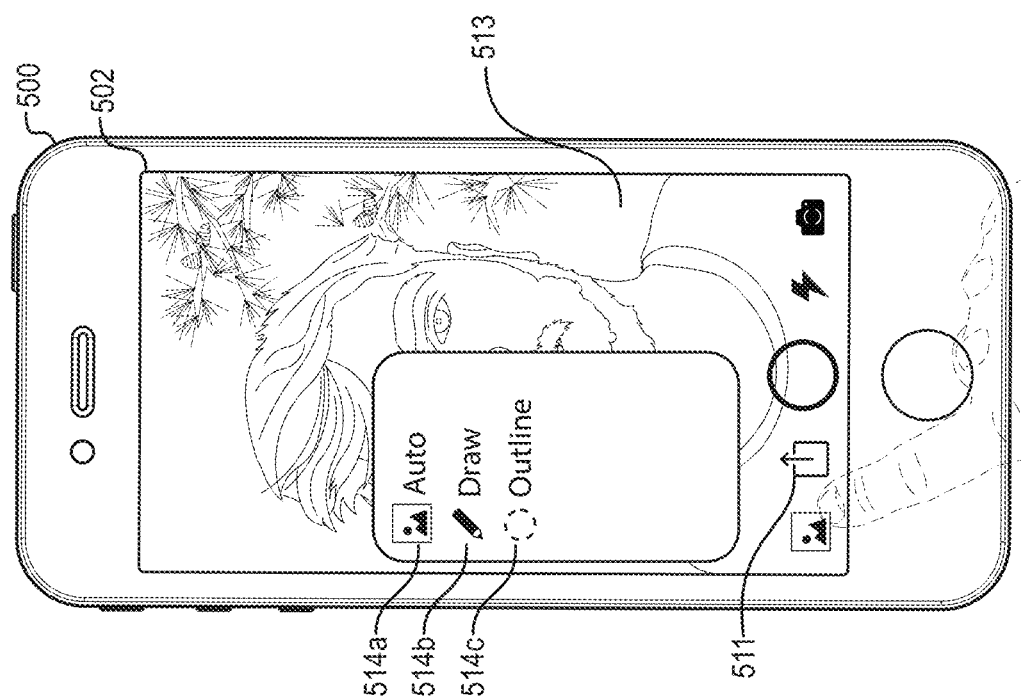
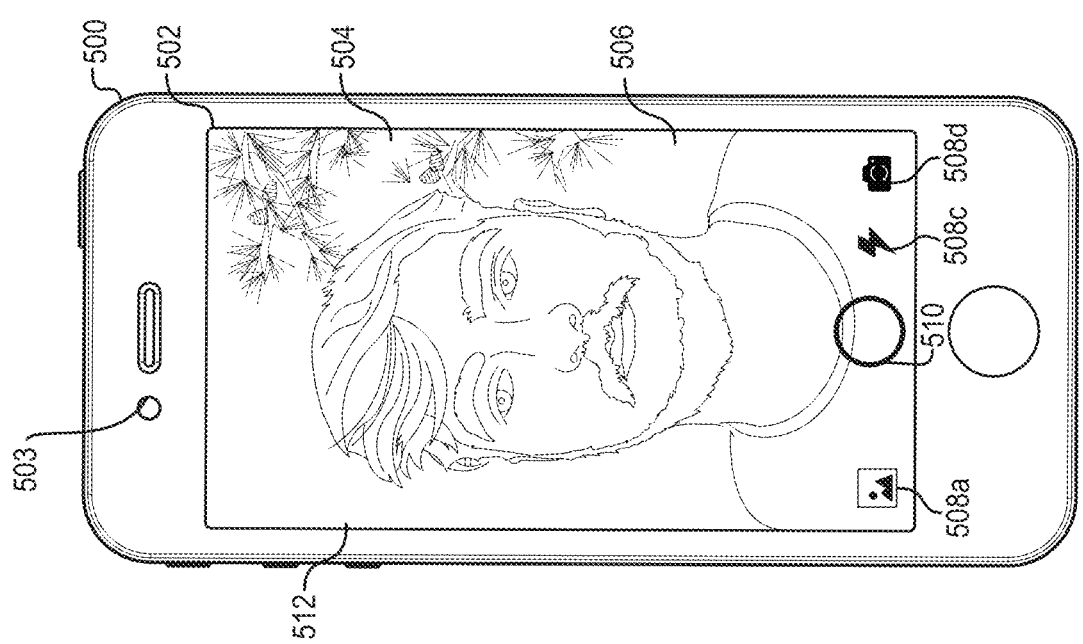
FIG. 5B
FIG. 5A

AUTOMATICALLY SELECTING IMAGES USING MULTICONTEXT AWARE RATINGS

BACKGROUND

Recent years have seen significant increases in both technologies for, and use of, digital photography. Indeed, the advent of smart phones with integrated, high quality cameras has led to large percentages of people carrying digital cameras with them almost constantly. This has led to massive increases in the number of digital photos being taken. Not only has the number of digital photographs recently increased, so has the ease and speed of sharing digital photographs. For example, smart phones with social networking applications, allow users to share digital photographs almost immediately after capture. Users now seek to capture and share the "perfect picture" as quickly as possible.

One recent advance in aiding photographers in capturing high quality photographs is burst mode or continuous shooting. Digital cameras with burst mode capture multiple frames or images per second. Indeed, digital cameras with burst mode can capture tens of images per second. Burst mode photography helps photographers capture a high-quality image in various different types of moments. For example, using burst mode during an action moment (like a child blowing out candles), allows a photographer to capture dozens of images of the moment and select the exact desired instance of the moment. Thus, burst mode allows for the capture of events, which because of the fast rate of occurrence, can be difficult to capture with manual shooting.

Burst mode also is very beneficial in capturing group portraits, as it allows a photographer to increase the odds of capturing an image with everyone in the group looking forward with their eyes open. Additionally, photographers often use burst mode to capture moments lacking action or people, so as to have multiple different images from which to select an aesthetically pleasing image.

While burst mode photography provides various advantages, burst mode photography also presents a number of drawbacks. For example, conventional burst mode photography systems typically require the user to review and compare each of potentially dozens of images to identify a desired or high-quality image of a moment. Reviewing burst mode images to select a high or highest quality image can be both tedious and time consuming because of the difficulty in comparing such similar images. Furthermore, the use of handheld devices with relatively small displays exacerbates these problems. The time and effort associated with selecting a high-quality burst mode image can deter users from employing burst mode when they are trying to capture and share an image quickly.

In addition to the foregoing, the use of burst mode photography can quickly fill storage space on image capturing devices. As such, users often have to search through burst mode images not only to select high quality images, but to delete un-wanted images to free up storage space. Thus, the storage space that burst mode photography uses, particularly with devices that capture high-quality images with larger storage sizes, deters users from employing burst mode photography.

Recent photo management systems provide the ability to automatically classify digital images as high-quality images or low-quality images. Such binary classifications, however, are typically unhelpful when analyzing burst mode images as burst mode images often have the same binary quality. Furthermore, such binary rating systems often fail to account for differences between image context when rating images.

These and other problems exist with conventional image capture and management systems.

SUMMARY

One or more embodiments described below provide benefits and/or solve one or more of the foregoing or other problems in the art with systems, methods, and computer readable media that automatically select a high-quality burst mode image using context-aware image selection techniques. In particular, the systems, methods, and computer readable media employ intelligent techniques that identify, rate, and select images in a context aware manner. For example, the systems, methods, and computer readable media rate images using multiple different context-specific scoring algorithms. The systems, methods, and computer readable media then combine the multiple context-specific scores in an intelligent manner to generate a multi-context aware rating. The systems, methods, and computer readable media then use the multi-context aware rating for each bust mode image to automatically select a top-rated image. In this manner, the disclosed systems, methods, and computer readable media intelligently and automatically select a high-quality burst mode image, thereby, eliminating the need for users to manually select images, and the time and effect associated therewith.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which:

FIGS. 5A-5B illustrate graphical user interfaces for displaying an automatically selected burst mode image based on context in accordance with one or more embodiments;

DETAILED DESCRIPTION

Figure 1:
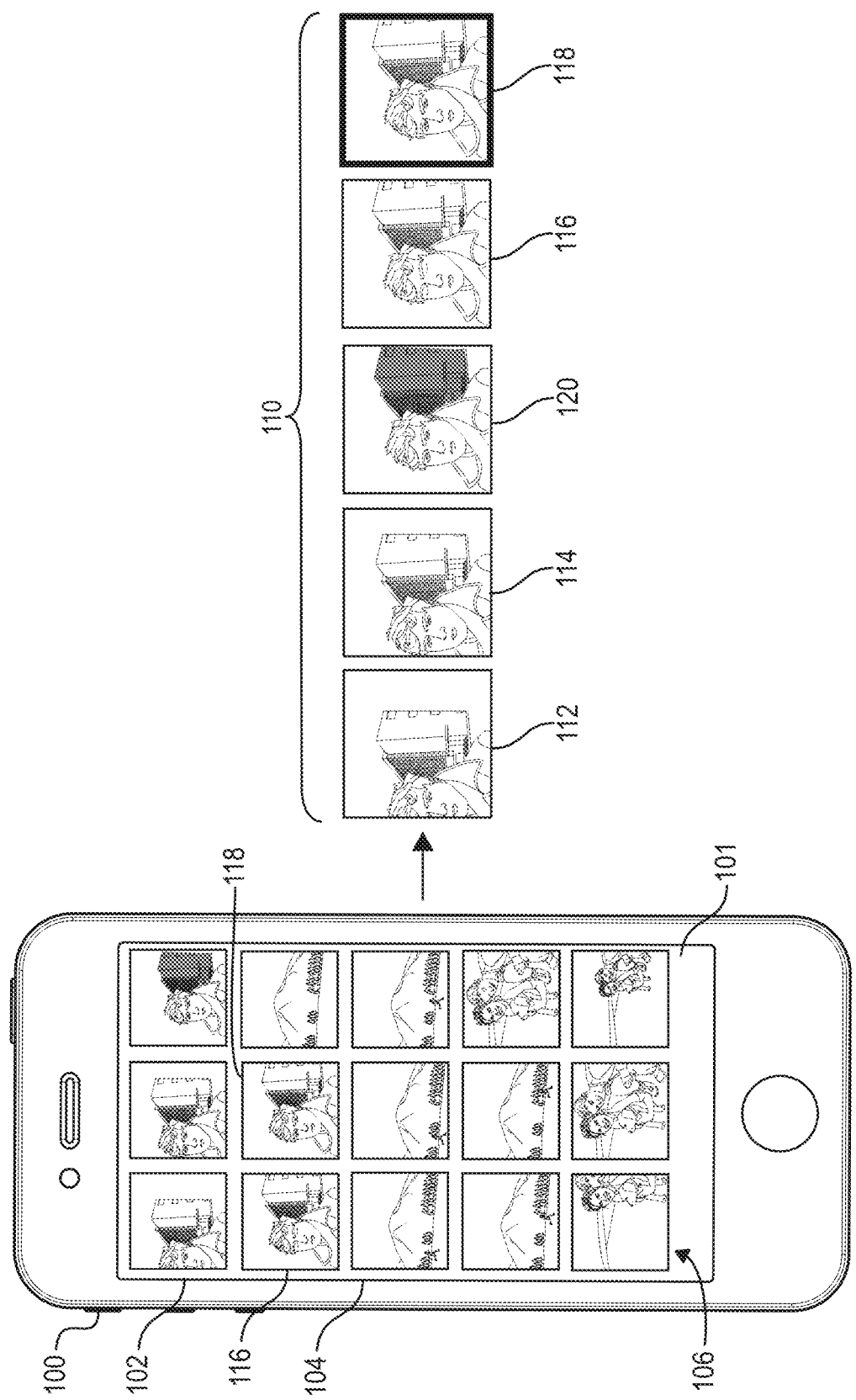
FIG. 1 illustrates a graphical user interface of a handheld device displaying a plurality of selfie images in accordance with one or more embodiments.

One or more embodiments of the present disclosure include a context-aware image selection system that automatically selects an image from a plurality of images using scoring and selection techniques that account for various contexts of an image. In particular, in one or more embodiments, the context-aware image selection system recognizes multiple different contexts for each image and factors each context when scoring or rating the images. In this manner, the context-aware image selection system intelligently and automatically selects a high-quality image, thereby, eliminating both the need for users to manually select images and the associated time and effect.

More particularly, the context-aware image selection analyzes each image to determine the various contexts included in the image (e.g., a selfie context, a group portrait context, a landscape scenery context, a food context). The context-aware image selection system then generates, for each image, a context-specific score for one or more of the contexts included in the image. The context-aware image selection system then combines the context-specific scores to generate a multi-context aware rating for each image. The context-aware image selection system automatically selects the image with the highest multi-context aware rating to surface to the user.

As just mentioned, the context-aware image selection system determines the various contexts included in an image. In particular, the context-aware image selection system can determine a probability that the image belongs to each of a plurality of context categories. For example, in one or more embodiments, the context-aware image selection system performs object recognition on the image to identify one or more objects in the image. The context-aware image selection system then assigns a probability that the images belongs to each of the context categories based on the recognized objects in the image. In alternative embodiments, the context-aware image selection system generates and trains a neural network to generate a probability that an image belongs to each of a plurality of context categories.

The context-aware image selection system also generates context-specific scores for each image. For example, in one or more embodiments, the context-aware image selection system generates a context-specific score for one or more of the contexts identified in an image. To generate the context-specific scores, the context-aware image selection system uses context-specific scoring algorithms. More specifically, the context-aware image selection system can generate a plurality of attribute-quality scores that rate attributes of the image. For example, the context-aware image selection system can train a neural network to generate the attribute-quality scores. The context-aware image selection system then combines the attribute-quality scores using unique combinations for each context to generate the context-specific scores.

In one or more embodiments, the context-aware image selection system combines the attribute-quality scores using a different combination of weights for each context. In one or more embodiments, the weights for each context are predefined. In other embodiments, a user can modify or customize the weights. In still further embodiments, the context-aware image selection system trains a neural network to learn the weights for each context. In any event, the context-aware image selection system can combine attribute-quality scores using context-specific weights.

In addition to the foregoing, the context-aware image selection system generates multi-context aware ratings. Specifically, in one or more embodiments, the context-aware image selection system generates the multi-context aware rating by combining the context-specific scores for an image based on the context probability scores. For example, in one or more embodiments, the context-aware image selection system generates the multi-context aware rating by multiplying each context-specific score by the context probability score for the relevant context. The context-aware image selection system then combines the probability adjusted context-specific scores to generate a multi-context aware rating. With the multi-context aware rating, the context-aware image selection system identifies an image to serve to the user. In particular, in one or more embodiments, the context-aware image selection system selects the image with the highest multi-context aware rating.

As previously mentioned, the context-aware image selection system provides numerous advantages and benefits over conventional systems and methods. As an example, the context-aware image selection system can increase the speed at which users can capture and share a desired particular instant of a moment. In particular, the context-aware image selection system can capture a plurality of images of a moment using a burst mode capture technique. The context-aware image selection system can then automatically select the "best" or "desired" image of the burst mode images using the techniques described above. The context-aware image selection system then surfaces the selected image for almost instantaneous sharing or editing without the need for the user to attempt to compare and contrast potentially dozens of burst mode images.

Furthermore, the context-aware image selection system can reduce high memory storage usage typically associated with burst mode images. For example, upon capturing a plurality of images in burst mode, the context-aware image selection system can store the images in a buffer of the image capturing device. The context-aware image selection system can then automatically select a high-quality image from the burst mode images using the context-aware techniques described above. The context-aware image selection system then writes the selected high-quality image to the memory of the image capturing device while deleting the non-selected images from the image capturing device. Thus, the context-aware image selection system can help ensure that the unwanted or low-quality burst images do not use up valuable storage space.

As illustrated by the foregoing discussion, the present disclosure utilizes a variety of terms to describe features and advantages of the context-aware image selection system. Additional detail is now provided regarding the meaning of such terms. For instance, as used herein, the term "image" or "frame" refers to any digital item capable of producing a visual representation. For instance, the term "image" includes digital images and frames of digital video. As used herein, the term "digital image" refers to any digital symbol, picture, icon, or illustration. For example, the term "digital image" includes digital files with the following file extensions: JPG, TIFF, BMP, PNG, RAW, or PDF.

As used herein the term "context" refers to types or categories of images based on the content in the images. Example image contexts include selfie, group portrait, indoor shot, outdoor shot, landscape shot, action shot, food shot, etc. Furthermore, an image can correspond to or have multiple contexts. For example, an image can be both a food shot and a selfie or an outdoor shot, an action shot, a landscape shot, and a group portrait.

As used herein the term "context probability score" refers to a numeric value representative of a likelihood of an image corresponding to a having a specific context. For example, a context probability score can comprise a value between zero and one, or between zero percent and one-hundred percent, indicating a likelihood that an image has a particular context. Along related lines, a context probability vector is a vector comprising a plurality of context probability scores. For example, a context probability vector can comprise a value between zero and one for each of a plurality of contexts.

The term "context-specific algorithm," as used herein, refers to an algorithm for rating the quality of an image for a given context. In particular, a context-specific algorithm, upon receiving an input image, can output a context-specific score quantifying a quality of the input image using factors specific to the given context. For example, a selfie context-specific algorithm can output a selfie context-specific score that rates a quality of the image as a selfie based on selfie specific factors, such as the eyes being open, the face being center, the face including a smile, etc. A context-specific algorithm can be implemented by or embodied within a neural network or a column or branch thereof. In one or more embodiments, a "context-specific score" refers to a numeric score representative of the quality of an image for a given context. In one or more embodiments, a context-specific score can comprise a value between zero and one or between zero and one-hundred.

Furthermore, as used herein, the term "multi-context aware rating" refers to a score representative of the overall quality of an image considering multiple contexts. In particular, a multi-context aware rating can be a combination of context-specific scores output by different context-aware algorithms. In one or more embodiments, a context-specific score can comprise a value between zero and one or between zero and one hundred.

The term "machine learning," as used herein, refers to the process of constructing and implementing algorithms that can learn from and make predictions on data. In general, machine learning may operate by building models from example inputs (e.g., training), such as a training font set, to make data-driven predictions or decisions. In some example embodiments, machine learning is used for data mining, and statistical pattern recognition, such as collaborative feature learning, or learning features from a training image set, which can be supervised or unsupervised.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional neural networks (i.e., "CNNs"). In addition, a neural network is an algorithm (or set of algorithms) that implements deep learning techniques that utilize a set of algorithms to model high-level abstractions in data.

As used herein, the term "loss function" or "loss model" refers to a function that indicates error loss between feature vectors and/or probability vectors in multi-dimensional vector space. A machine-learning algorithm (e.g., neural network) can repetitively train to minimize and/or maximize classification error loss (e.g., how accurate or inaccurate the classification is to the ground truth). In some embodiments, the context-aware image selection system employs loss functions at different stages of training. An example of a loss function includes a classification loss model, which uses a softmax classifier with cross-entropy loss, as further described below.

Figure 2:
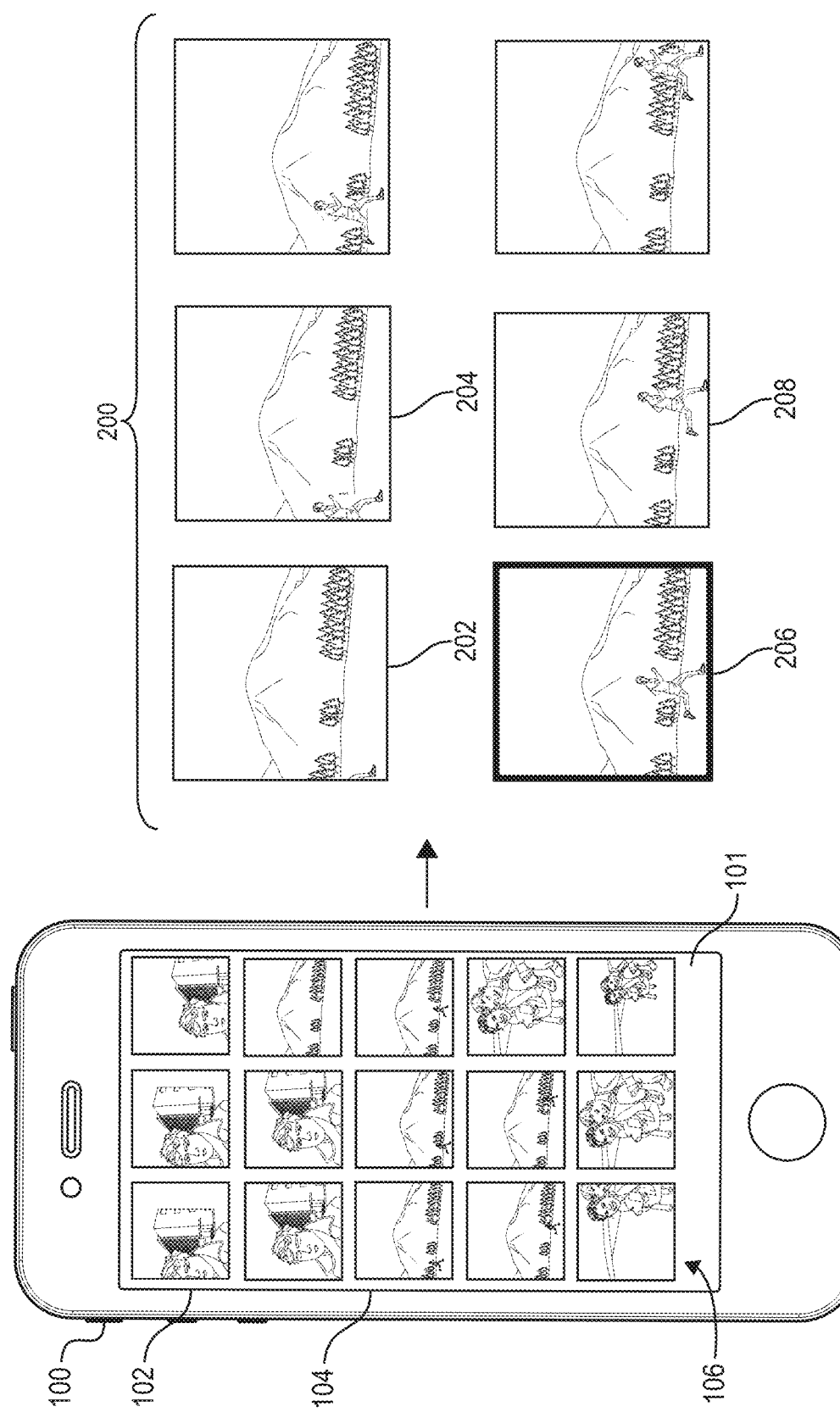
FIG. 2 illustrates a graphical user interface of a handheld device displaying a plurality of landscape images in accordance with one or more embodiments.
Figure 3:
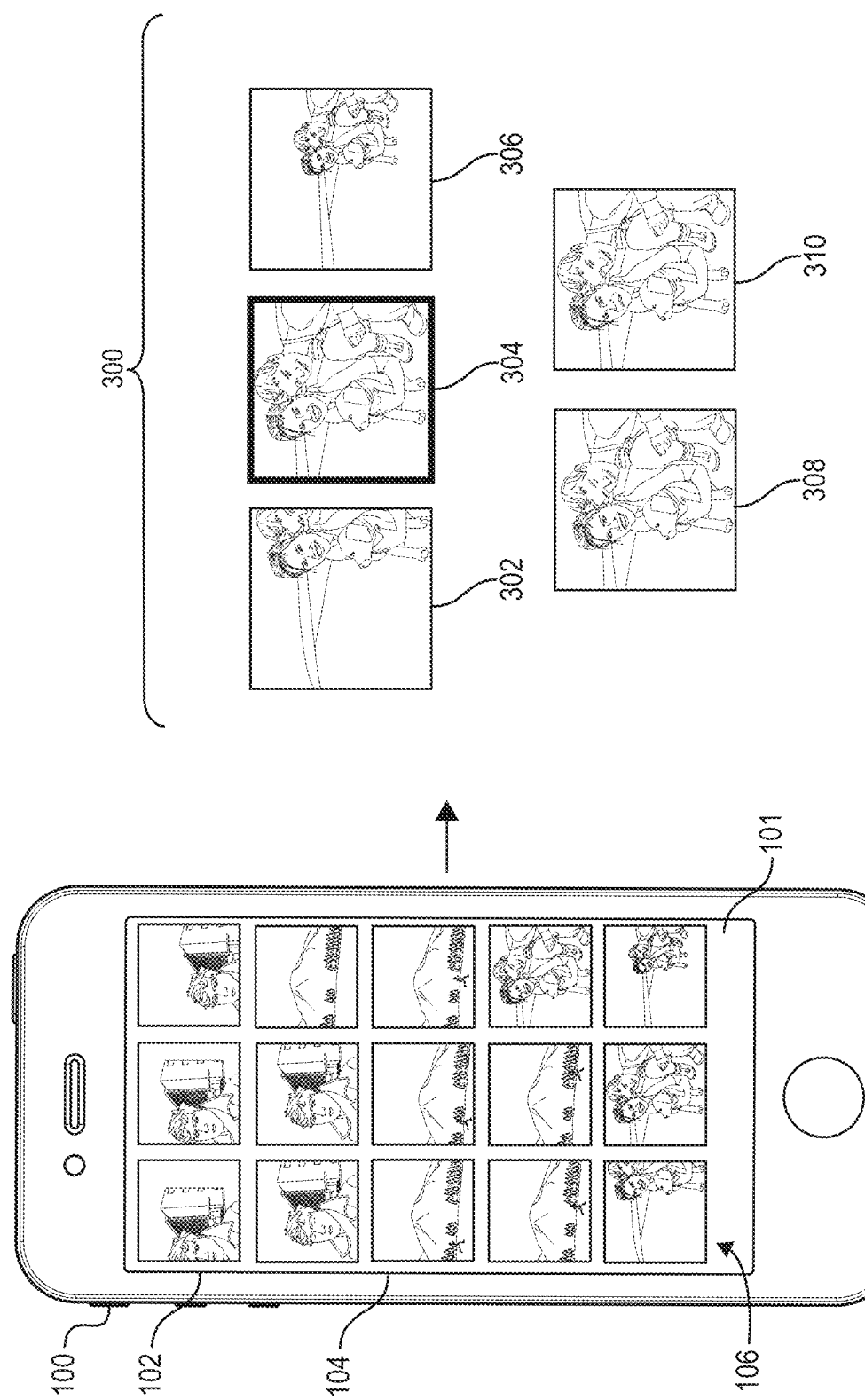
FIG. 3 illustrates a graphical user interface of a handheld device displaying a plurality of group portrait images in accordance with one or more embodiments.

Turning now to figures, FIGS. 1-3 illustrate various burst mode images having various contexts and attributes. These figures are provided to illustrate some of the factors that the context-aware image selection system can consider when automatically selecting an image. More detail regarding how the context-aware image selection system can use the attributes and images of FIGS. 1-3 is discussed in relation to FIG. 4. While FIGS. 1-3 describe details of one or more embodiments with regard to selecting a burst mode image, one will appreciate that the present invention is not limited to selecting burst mode images. Indeed, the principals and features described below can also be used to select a high-quality frame from a video, or a high-quality frame of a live photograph. In still further embodiments, the principals and features described below can also be used to select a high-quality image from any grouping of images.

FIG. 1 illustrates a client-computing device 100 with a display 102 showing a plurality of images 106. More specifically, a user interface 104 of an image management system displays the plurality of images 106 (showing three distinct groups of burst mode image). As used herein, burst mode images refer to images captured using a burst mode setting. In other words, the term burst mode image refers to one of a group of images captured in rapid succession (e.g., at four frames per second or greater).

As shown by FIG. 1, due to the size of the display of the client-computing device 100, each of the images of the plurality of images 106 has a small display size. Due to the small size of the images 106, it can be difficult to compare and contrast the images 106. This is particularly the case when the images 106 are all directed to the same moment or include substantially the same content. For example, it is relatively difficult to determine that the eyes of the subject are closed in image 116 but open in image 118. As explained above, the context-aware image selection system can alleviate the time and effort of having to compare small image thumbnails or previews to identify a high-quality burst mode or other image.

FIG. 1 further shows a magnification of a plurality of burst mode images 110. The context-aware image selection system can determine that the plurality of burst mode images 110 comprise portraits of a single person, and thus, have a selfie context. The plurality of burst mode images 110 are provided to illustrate some of the factors the context-aware image selection system can consider when evaluating the quality of an image having a selfie context. The context-aware image selection system can determine that the image 112 shows a face not completely captured in the canvas of the image. The context-aware image selection system can determine that image 114 has a higher quality than image 112 due to image 114 including the full face of the subject. The context-aware image selection system can determine that image 114 nevertheless suffers from the face of the subject being in a corner of the image 114. The context-aware image selection system can determine that image 116 shows the subject's face centered in the canvas of the image, but the subject's eyes are closed. The context-aware image selection system can determine that images 118 and 120 show the face centered in the image and the subject's eyes are open. The context-aware image selection system can determine that the building in the background of image 120 is in a shadow. FIG. 1 illustrates that the context-aware image selection system has selected image 118 as having the highest quality.

FIG. 2 illustrates a magnification of a second plurality of burst mode images 220. The context-aware image selection system can determine that the images 202-208 comprise scenery, and thus, have a landscape context. FIG. 2 shows that the context-aware image selection system has selected image 206 as having the highest quality. FIG. 2 illustrates how images 202-208 include images of scenery with a mountain. The context-aware image selection system can determine that images 204-208 each include a runner that at least partially occludes the mountain scenery. The context-aware image selection system can determine that the runner is centered in image 206 and that the runner's face is present in the image. The context-aware image selection system can determine that image 208 shows a runner in the frame of the image, but the runner's face is not visible.

FIG. 3 illustrates a magnification of a third plurality of burst mode images 300. The context-aware image selection system can determine that the images 302-310 comprise multiple faces, and thus, can include a group portrait context. The context-aware image selection system can identify that one of the faces of image 302 is not entirely in the frame of the image 302. The context-aware image selection system can determine that image 304 contains the entirety of two faces. The context-aware image selection system can further identify that the faces in the group portrait image 304 are centered in the image. The context-aware image selection system can determine that the percentage of the image containing faces is less in 306 than in 304, 308, and 310. The context-aware image selection system can identify that one of the faces of image 308 has closed eyes. The context-aware image selection system can determine that image 310 has a face that is not smiling. As shown in FIG. 3, the context-aware selection system selects image 304 as having the highest quality.

Figure 4:
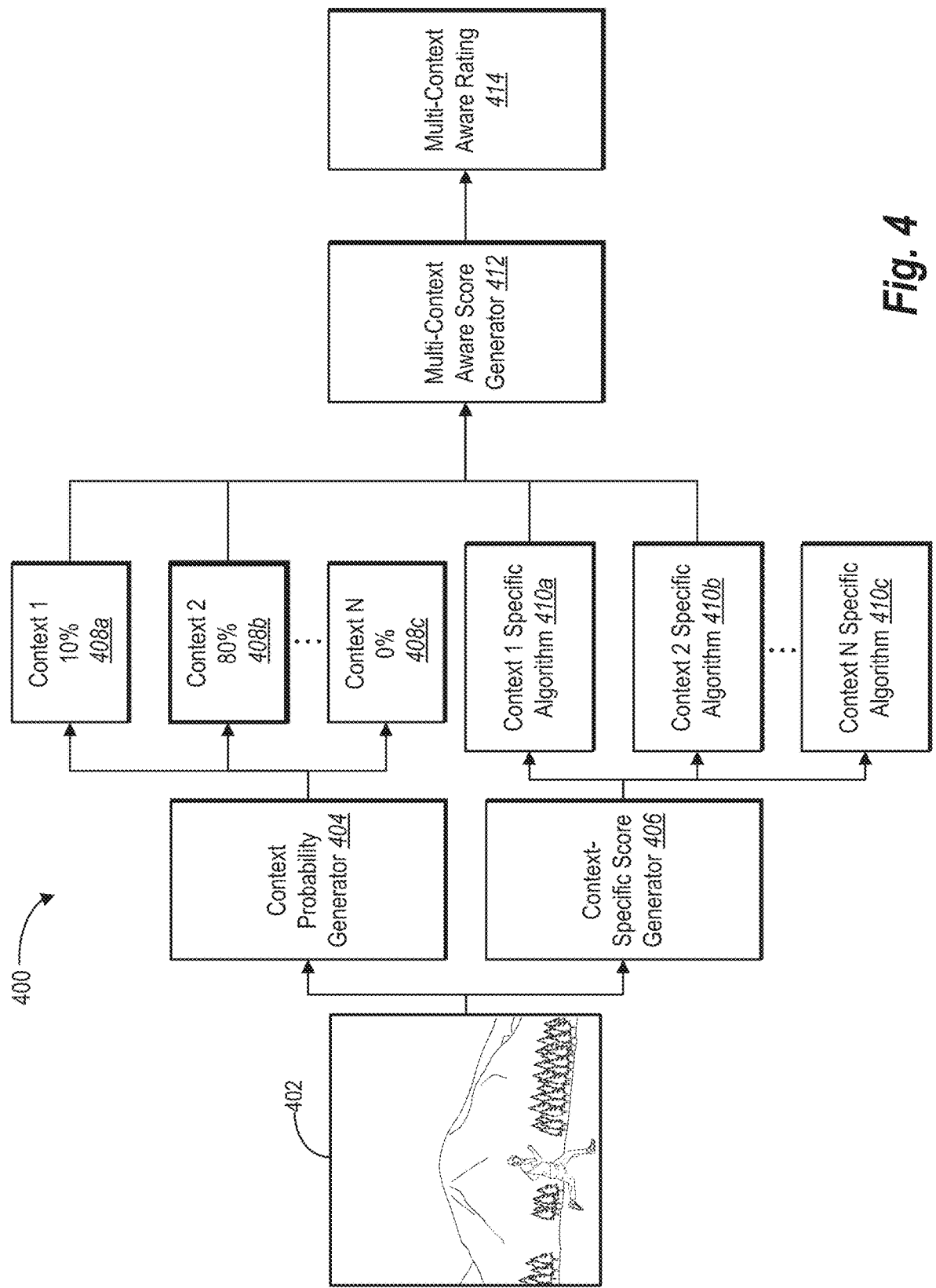
FIG. 4 illustrates a schematic representation of a process of generating a context-aware rating for an image in accordance with one or more embodiments.

Turning now to FIG. 4 more detail is provided on the acts and steps the context-aware image selection system 400 takes to automatically select a high-quality burst mode image such as those shown in FIGS. 1-3. As an initial matter, FIG. 4 illustrates the context-aware image selection system 400 including a context probability generator 404, a context-specific score generator 406, and a multi-context aware rating generator 412. While FIG. 4 illustrates these generators as separate, in one or more embodiments, the context probability score generator 404, the context-specific score generator 406, and/or the multi-context aware rating generator 412 can be combined and implemented as a single generator.

The context probability score generator 404 generates context probability scores for an image that reflect the probability that each of a plurality of contexts applies to the image. Specifically, in one or more embodiments, the context probability score generator 404 can receive an image 402 and output a context probability score 408a-408n for each of a plurality of contexts (i.e., contexts 1-n).

In one or more embodiments, the context probability score generator 404 performs object recognition on the image to identify objects included in the image 402. The context probability score generator 404 then generates the context probability scores 408a-408n based on the objects recognized in the image 402. For example, the context probability score generator 404 can associate various objects with each context. The context probability score generator 404 can then assign a probability that an image 402 has a context based on whether the context probability score generator 404 identified any of the objects associated with the context in the image. For example, the context probability score generator 404 can maintain a database that associates objects with contexts. The context probability score generator 404 can identify objects and then map the objects to one or more contexts based on the database. The context probability score generator 404 can further base the probability on the number of objects, the size of the objects, the location of the objects, etc.

Turning to the example in FIG. 4, the context probability score generator 404 identifies objects present in the image 402 (e.g., the mountain, the runner, the trees, and the face of the runner). The context probability score generator 404 generates a probability score for each context for the image 402 based on the identified objects. For example, in relation to FIG. 4, context 1 can comprise selfie, context 2 can comprise landscape, and context N can comprise group portrait. The context probability score generator 404 can provide positive context probability scores 408a, 408b for contexts 1 and 2 based on identifying objects associated with the contexts 1 and 2 in the image 402. For example, based on identifying a face in the image 402, the context probability score generator 404 determines a positive context probability score 408a for the selfie context. Similarly based on identifying a mountain and trees in the image 402, the context probability score generator 404 determines a positive context probability score 408b for the landscape context. On the other hand, based on identifying a single, rather than multiple, faces the context probability score generator 404 determines a context probability score 408n of zero for the group portrait context.

As shown, the context probability score generator 404 determines a context probability score of 10% that the image 402 correlates with context 1 (selfie context) and a context probability score of 80% that the image 402 correlates with context 2 (landscape context). The context probability score generator 404 can determine a lower context probability score for the selfie context based on the small size of the face (i.e., the size of the face in proportion to the size of the image or the size of the face in proportion to the size of objects associated with other contexts). Furthermore, the context probability score generator 404 can determine a lower context probability score for the selfie context based on the location of the face being toward the bottom of the image.

In like manner, the context probability score generator 404 can determine a higher context probability score for the landscape context based on the size and/or number of the objects (i.e., mountains, trees) associated with the landscape context in the image 402 compared to the size and/or number of objects (i.e., the face) in the image 402 associated with other contexts. Additionally, the context probability score generator 404 can determine a higher context probability score for the landscape context based on the location of the objects in the image 402 associated the landscape being positioned in the center of the image 402.

In alternative embodiments, rather than using object recognition and the associated techniques described above, the context probability score generator 404 can comprise a neural network that learns to classify contexts of images. For example, as explained below in relation to FIG. 7, the context probability score generator 404 can comprise a context probability predictor neural network, that given an image, outputs a context probability vector including a context probability score for each of a plurality of contexts.

As mentioned, the context-aware image selection system 400 further includes a context-specific score generator 406. The context-specific score generator 406 uses context-specific algorithms to provide a context-specific quality score for an input image. In one or more embodiments, the context-specific score generator 406 uses the probability scores produced by the context probability score generator 404 to inform which specific contexts to analyze. For example, the context probability score generator 404 returned a 0% probability for the image 402 in relation to context N. Using this information, the context-specific score generator 406 can avoid generating a context-specific score for context N.

While the above example includes the context-aware image selection system 400 not generating a context-specific score when a context probability score is 0%, in one or more embodiments, the context-aware image selection system 400 does not determine a context-specific score for contexts with a probability score below a predefined threshold. For example, the context-specific score generator 400 can avoid generating context-specific scores for any context having a probability below 10%, 5%, 2%, 1% or another threshold. By identifying contexts not to process, the context-specific score generator 406 can increase the efficiency of the context-aware image selection system 400 and reduce the processing power and computational resources used by the context-aware image selection system 400.

As mentioned above, the context-specific score generator 406 generates context-specific scores for an image using context-specific algorithms. In particular, FIG. 4 shows the context-specific score generator 406 using a context 1 specific algorithm 410a, context 2 specific algorithm 410b, and context N specific algorithm 410c. More particularly, the context-specific score generator 406 can generate attribute-quality scores for various attributes or characteristics of an image. Each of the context-specific algorithms 410a-410n can use attributes scores and weights to determine a context-specific score.

As used herein "attribute-quality score" refers to a numeric score representative of the quality of an attribute of an image. In one or more embodiments, an attribute-quality score can comprise a value between zero and one or between zero and one-hundred. Attributes can comprise low-level attributes such as blurriness, sharpness, compression, lighting, color histogram, wavelet, etc. Attributes can also comprise high-level attributes such as eyes open, face quality, rule of thirds, image aesthetics, facial expression, smiling face, pose etc.

The context-specific score generator 406 determines attribute-quality scores for a plurality of attributes. For example, in one or more embodiments, the context-specific score generator 406 employs a neural network trained to output attributes scores for each of a plurality of attributes using attribute classifiers. More detail regarding such neural networks is provided in relation to FIGS. 6A-6B below.

Included below is a general context-specific algorithm to aid in understanding how the context-specific score generator 406 can, in one or more embodiments, generate a context-specific score for an image. Additional algorithms will be presented, and for the sake of clarity this algorithm will be referred to as algorithm 1.

$$S^c(i) = w_p P(i) + w_q Q(i) \tag{1}$$

In algorithm 1, "i" is used to represent a unique image. "$S^c(i)$" represents a context-specific score for an image i. "$P(i)$" represents an attribute-quality score for image i for attribute p. "$Q(i)$" represents an attribute-quality score for image i for attribute q. Furthermore, "$w_p$" represents a weight for attribute p and "$w_q$" representing a weight for attribute q. Thus, a context-specific score for a particular image is equal to the sum of the weight adjusted attribute-quality scores relevant to the context being evaluated for that image.

Moreover, a context-specific algorithm can combine a plurality of attributes scores using a combination of weights. While algorithm 1 illustrates a combination of two attributes scores ($P(i)$ and $Q(i)$), in alternative embodiments, a context-specific algorithm can combine 3, 4, 5, 10, or more attributes scores. In one or more embodiments, each context-specific algorithm uses the same attribute-quality scores. In other embodiments, different context-specific algorithms can use different attributes scores. In one or more embodiments, the non-use of a particular attribute-quality score can be reflected by a weight for that attribute-quality score being zero.

Furthermore, each context-specific algorithm can combine attribute-quality scores using a unique combination of weights. The combinations of weights can be unique in that there are weights for different attributes or different weights for the same attributes. While the combination of weights is unique for each context-specific algorithm, one will appreciate that individual weights in the combination can be the same so long as at least one weight differs so as to produce a unique combination.

In one or more embodiments, the weights for each context-specific algorithm are predefined. In alternative embodiments, the weights for each context-specific algorithm are set by the user. In still further embodiments, the weights for each context-specific algorithm are learned. For example, as described in greater detail below in relation to FIGS. 6A-6B, in one or more embodiments, a neural network can include a weight prediction classifier that learns the weights for a given context.

In any event, the context-specific score generator 406 can generate, for each image, a context-specific score for each of a plurality of images. To illustrate, referring to FIG. 1, the context-specific score generator 406 generates a selfie context-specific score for the image 116 and for image 118. The context-specific score generator 406 can generate a selfie context-specific score for the image 116 that is lower than the selfie context-specific score for the image 118 based at least on a lower face attribute-quality score for the face in the image 116 (closed eyes) than for the face in the image 118 (open eyes). In this example, both images contain a single face of the same size, thus affording no differing weight to the face in one image over the face in the other image.

In comparison, by way of an additional example, the context-specific score generator 406 generates differing weights for the faces in the image 304 in FIG. 3. Specifically, the percentage of the image 304 that the boy's face occupies is larger than that occupied by the girl's face. The context-specific score generator 406 may use this difference in face size to assign a greater weight to the face of the boy than to that of the girl. Thus, the face attribute-quality score of the boy's face has a greater impact on the group portrait context-specific score than that of the girl's.

Aside from using different algorithms for different contexts, the context-specific score generator 406 can generate a plurality of context-specific scores for a given image. For instance, referring to FIG. 2, the context-specific score generator 406 generates a landscape context-specific score. Additionally, the context-specific score generator 406 generates a selfie context-specific score for the image 204 that is lower than the selfie context-specific score for the image 206 (based on the face of the runner being oriented to the camera in the image 206 and not in the image 204).

While algorithm 1 is a general context-specific algorithm, one or more embodiments can employ more complex context-specific algorithms. For example, to score an image with a group portrait context, the context-specific score generator 406 can determine a face quality score for each face in each image of the burst mode images. The context-specific score generator 406 can identify a maximum face quality score for each face from among the face quality scores for a given face. In other words, the context-specific score generator 406 can, for a person's face included in multiple burst mode images, determine a face quality score for each instance of the person's face and then identify which face quality score for the person's face is the highest. At this point or before, the context-specific score generator 406 can adjust each face quality score by a sizing factor. In particular, the context-specific score generator 406 can generate a sizing factor for each face by determining the surface area of the face in an image and dividing it by the total surface area of all faces in the image. The context-specific score generator 406 can then generate a face quality score differential for each face. In particular, for each face in each image, the context-specific score generator 406 can determine a difference between the face quality score for the instance of the face in a given image and the maximum face quality score the face. The context-specific score generator 406 can then generate a combined face quality score for each image by summing the face quality score differentials for each face included in a given image. The context-specific score generator 406 can give the image with the smallest combined sum of face quality score differentials the highest combined image quality score.

The combined face quality score can help ensure that the context-specific score generator 406 does not score an image with a particularly poor instance of a person's face with the highest face quality score. In other words, the context-specific score generator 406 can score an image having a group portrait context in a manner so as to score images the highest in which everyone has a relatively good quality face. In particular, the context-specific score generator 406 can seek to avoid selecting an image in which one or more people have particularly good faces but one or more others have a particularly poor face (e.g., eyes close, face occluded, frowning).

The context-aware image selection system 400 uses both the context-specific scores for each context in combination with the context probability scores to generate a multi-context aware rating for each image. Specifically, the context-specific score generator 406 can combine the context-specific scores and the context probability scores using the following algorithm (herein after "algorithm 2"):

$$S(i)=\Sigma_{c=0}^{N}P(c)(S^c(i)) \quad (2)$$

Algorithm 2 uses the same notation as algorithm 1. In addition, algorithm 2 also uses "P(c)" to represent a context probability score for context "c." Algorithm 2 calculates a multi-context aware rating for each image by summing the product of the context probability score of each relevant context and the context-specific score for each relevant context for an image.

FIG. 4 generally represents this formula by indicating that both the context probability scores 408*a*-408*b*, and the context-specific scores 410*a*-410*b* are used by the multi-context aware rating generator 412. Thus, in one or more embodiments, the multi-context aware rating generator 412 will multiply each of the context-specific scores 410*a*-410*n* result by the correlating context probability scores 410*a*-410*n*. For example, the result of the context 1 specific algorithm 410*a* is multiplied by the context 1 probability score 408*a*. That result is summed with the result similarly calculated for context 2. The final result is the multi-context aware rating 414 for the image 402.

Algorithm 2 may also be represented more specifically to incorporate the attribute scores relevant to each context. Algorithm 3 rewrites algorithm 2 by incorporating algorithm 1 therein:

$$S(i)=\Sigma_{c=0}^{N}P(c)(w_p^c P^c(i)+w_q^c q^c(i)+ \ldots +n_m^c m^c(i)) \quad (3)$$

Algorithm 3 uses the same notation as algorithms 1 and 2. Moreover, the algorithm 3 further illustrates that the context-specific attributes and weights can continue up to the $N^{th}$ attribute. Algorithm 3 shows this by the " . . . $+n_m^c m^c(i)$" term, where "n" represents the $N^{th}$ weight and "m" represents the $M^{th}$ attribute relevant to the context. Due to the more specific nature of the algorithm 3, the portions of "$w_p^c P^c(i)+w_q^c q^c+ \ldots +n_m^c m^c(i)$" may vary for each context "c" relevant to an image.

After the context-aware image selection system 400 processes the image 402 via the multi-context aware rating generator 412, the context-aware image selection system 400 generates a multi-context aware rating 414. The multi-context aware rating 414 facilitates the comparison of a plurality of images by the context-aware image selection system 400. Specifically, after processing a plurality of images that were taken to capture a common moment (e.g., burst image), the context-aware image selection system 400 can compare the multi-context aware ratings for the images. The context-aware image selection system 400 can then select the image with the highest multi-context aware rating. For example, the context-aware image selection system 400 receives the burst mode images 200. The context-aware image selection system processes each image of burst mode images 200 as explained above in relation to FIG. 4. Thereafter, the context-aware image selection system 400 compares the multi-context aware rating for each image in the burst mode images 200 and selects the image with the highest multi-context aware rating to surface to the user.

The context-aware image selection system's use of multiple context-aware algorithms can allow the context-aware image selection system 400 to make more accurate and robust determinations. In particular, the context-aware image selection system 400 can rate images more accurately than conventional image rating systems while also being able to handle large varieties and combinations of image content. Furthermore, the use of the context probability scores to combine the scores from multiple context-aware algorithms can ensure that attributes unimportant to a context of an image does not control the rating for an image. As an example of the foregoing, referring to FIG. 1, the context-aware image selection system 400 can determine similar, or the same, selfie attribute-quality specific scores for each of image 118 and 120 due to the similarity of the faces. The context-aware image selection system 400, however, can also determine landscape context-specific scores for the image 118 and 120. For example, the context-aware image selection system 400 can determine a landscape context-specific score for the image 120 that is lower than a landscape context-specific score determined for the image 118 due to the building in the image 120 being in shadow. Therefore, this is based at least on the darker building in the background of the landscape of the image 120, as compared to the brighter building in the background of the landscape of the image 118. The context-aware image selection system 400 generates multi-context aware ratings for the image 118 and 120 by combining the landscape context-specific scores, and the selfie context-specific scores based on their associated context probability scores. The context-aware image selection system 400 can then determine that the image 118 has a higher multi-context aware rating than the image 120. Thus, the context-aware image selection system 400 can generate a higher image rating representative of "better quality" due to the use of multiple context-specific scores in generating a multi-context aware score.

As another example, referring to FIG. 2, the context-aware image selection system 400 can determine similar, or the same, landscape attribute-quality scores for each of the image 206 and 208 due to the similarity in quality of the backgrounds of the images. The context-aware image selection system 400, however, can also determine selfie context-specific scores for the image 206 and 208. For example, the context-aware image selection system 400 can determine a selfie context-specific score for the image 208 that is lower than a selfie context-specific score determined for the image 206 due to the face in image 208 being turned aside, while the face in image 206 faces the camera. The context-aware image selection system 400 generates multi-context aware ratings for images 206 and 208 by combining the landscape context-specific scores with the selfie context-specific scores, based on their associated context probability scores. The context-aware image selection system 400 can determine that the image 206 has a higher multi-context aware rating than the image 208. Thus, the context-aware image selection system 400 can rate an image higher via a multi-context aware score to represent a "better quality" image.

Thus, the multi-context aware rating generator 412 generates ratings for each image in a burst of images that identifies and scores differences between the images. In particular, by summing the probability adjusted context-specific scores for each context relevant to each image, the multi-context aware rating generator 412 provides a score for each image emphasizing the most probable contexts of the image. In this manner, the multi-context aware rating 414 for each image can be compared, and a relatively higher scoring image from the burst of images can be selected (i.e., the higher-quality image from the burst of images). Thus, by utilizing the multi-context aware rating generator 412, the context-aware image selection system 400 benefits the user. In particular, the user does not have to search through the plurality of small thumbnail images displayed on the user's mobile device to select a better image from the burst of images.

FIGS. 5A-5B illustrates an example of how the above described selection process may appear to the user via the client-computing device. Specifically, FIG. 5A illustrates a client-computing device 500 with a display 502 that includes a user interface 504. As shown in FIG. 5A the user interface 504 associated with an application. The application may be an embodiment of an image management system. The user interface 504 includes selectable elements 508*a* (for modifying objects in digital visual media), 508*b* (for modifying a camera flash), and 508*c* (for modifying a camera utilized to capture digital visual media, e.g., between a front and back facing camera). The user interface 504 also includes a capture element 510 (e.g., for capture digital visual media, such as a digital video or digital image).

In one or more embodiments, FIG. 5A illustrates the client-computing device 500 prior to the user beginning to take a burst of selfie images. For example, the user interface 504 displays a real-time digital visual media feed 506 from the front-facing camera 503 of the client-computing device 500. After user interaction with the capture element 510, the client-computing device 500 takes a plurality of burst mode images. FIG. 5B shows that the context-aware image selection system 400 returns a selected image 513 to the user via the client-computing device.

In particular, the context-aware image selection system 400 returns a selected image 513 to the user just after taking the burst of images. In this manner, the user does not have to search through the plurality of images captured by the use of burst mode capture. In addition, the user continues to receive the benefit of having multiple images taken to capture a single common moment. In this manner, the user is provided with the selected image 513 by the context-aware image selection system 400 according to the higher multi-context aware rating associated with that image (each burst of images being compared to the other images in that same burst).

In one or more embodiments, the context-aware image selection system's 400 process of processing and selecting a high-quality burst mode image 513 is transparent to the user. In particular, the context-aware image selection system 400 can score all of the burst mode images and select the high-quality burst mode image 513 without surfacing the non-selected burst mode images to the user via the user interface 504. Furthermore, the context-aware image selection system 400 can score all of the burst mode images and select the high-quality burst mode image 513 in a manner of seconds or even milliseconds.

In addition to returning the selected image in FIG. 5B, the image management system may provide additional tools to allow the user to edit or share the high-quality burst mode image 513. Specifically, the user interface 504 can include tools to edit the image upon receiving user interaction with the selectable element 508*a* (as indicated by the user finger touching the client-computing device display 502 in FIG. 5B). More specifically, the image management system may provide a filter option 514*a* (for adjusting the contrast and lighting of the image), an object insertion option 514*b* (for placing an object on the image, e.g., for writing text on top of the image), and an object tagging option 514*c* (for outlining and tagging an object in the image). In addition to the foregoing, the image management system can provide an option 511 to share the image 513, such as via a social networking application.

In alternative embodiments, rather than selecting an image for editing, the context-aware image selection system 400 can select an image for use as a cover image. For example, the context-aware image selection system 400 can analyze the frames of a video and select a high-quality frame as a thumbnail or cover to represent the video. Along similar lines, the context-aware image selection system 400 can analyze the frames of a live photograph (i.e., short video or animation of several frames before and after a central frame) and select a high-quality frame as a thumbnail or cover to represent the live photograph. In still further embodiments, the context-aware image selection system 400 can analyze images in a collection, folder, or other grouping of images and select a high-quality frame as a thumbnail or cover to represent the collection, the folder, or the grouping of images.

As mentioned above, the context-aware image selection system 400 can generate, train, and use one or more neural networks to perform one or more of the above-described functions. For example, FIG. 6A illustrate an example of a neural network 602 trained to generate an attribute quality score.

Figure 6A:
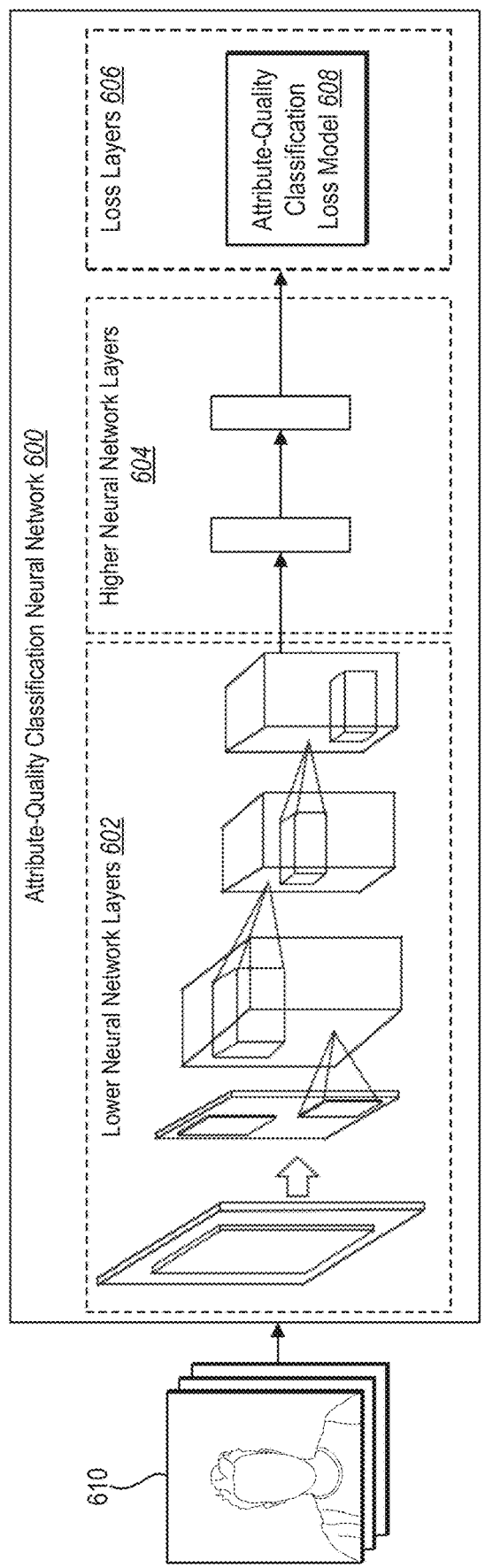
FIG. 6A illustrates an example neural network for generating an attribute-quality score in accordance with one or more embodiments.

As shown in FIG. 6A, the context-aware image selection system 400 generates an attribute-quality classification neural network 600. The attribute-quality classification neural network, along with the other neural networks described herein, can be a convolutional neural networks or other types of classification neural networks. The attribute-quality classification neural network, in one or more embodiments, can be trained using images comprising an attribute to be classified. For example, the context-aware image selection system 400 can train a face quality classification neural network with images comprises one or more faces. The context-aware image selection system 400 can employ a classification loss model to train the attribute-quality classification neural network, as further described below.

As shown, the attribute-quality classification neural network 600 includes lower neural network layers 602, higher neural network layers 604, and loss layers 606. The loss layers 606 include an attribute-quality classification loss model 608. In one or more embodiments, the lower neural network layers 602 are convolutional layers that encode images (or image patches) into feature vectors. The higher neural network layers 604 can comprise fully-connected layers that classify the feature vectors and output an attribute quality-probability vector. Because of their functions, the lower neural network layers 602 are collectively called an encoder and the higher neural network layers 604 are collectively called a classifier. In some embodiments, the attribute-quality classification neural network 600 is a deep learning convolutional neural network.

As illustrated, the attribute-quality classification neural network 600 in this example includes five convolution layers and two fully connected layers. The context-aware image selection system 400 configures the neural network layers 602, 604 to learn features or image characteristics, such as an amount of darkness, light, contrast, and so forth that together are usable to define higher-level image aesthetics and face aesthetics through use of an attribute quality score. For example, in order to learn whether an image is aesthetically "good" features of image characteristics such as lighting, noise, whether the image is "upright", and so on may be learned by the attribute-quality classification neural network 600 to define an attribute quality score.

In order to efficiently process the training images 610, the attribute-quality classification neural network 600 can employ patch-based neural network techniques. For example, rather than processing entire images, the attribute-quality classification neural network 600 can process image patches randomly sampled from the image having a fixed size, e.g., 128, 196, 256, 320 pixel sizes and so forth. Additionally, the attribute-quality classification neural network 600 can process the patches without down-sampling the image, and thus, may not lose information.

Thus, the attribute-quality classification neural network 600 can use training images 610, or patches thereof, to train the attribute-quality classification neural network 600. The attribute-quality classification neural network 600, for instance, is configurable to calculate features of image characteristics for each of the patches. As previously described, the image characteristics describe a variety of different attributes of an image, such as noise, darkness, contrast, structure, whether an alignment is upright, likelihood of including a part of an object (e.g., face), and so forth.

These features may be expressed in a variety of ways. For example, for each of the patches, a vector having a plurality of dimensions is generated in which each of the dimensions has a corresponding image characteristic. Thus, the vector expresses an amount of each of the respective image characteristics through use of the features using the dimensions of the vector.

The context-aware image selection system 400 can initially train the attribute-quality classification neural network 600 using the attribute classification loss model 608. As an overview, the context-aware image selection system 400 initially trains the attribute-quality classification neural network 600 by tuning parameters based on training images 610 (or training patches from the training images 610), which are used to generate attribute-quality classifications.

In addition, the context-aware image selection system 400 employs the attribute-quality classification loss model 608 to provide feedback based on the accuracy of the attribute-quality classifications, which enables the context-aware image selection system 400 to update the tunable parameters. More specifically, the context-aware image selection system 400 uses error loss feedback to tune feature extractions in the lower neural network layers 602 and higher neural network layers 604 to classify attribute-quality from the input training images.

To demonstrate, the context-aware image selection system 400 can provide the training images 610 as input to initially train the attribute-quality classification neural network 600. For example, in one or more embodiments, the context-aware image selection system 400 trains the lower neural network layers 602 by tuning feature extractions parameters, which are used to generate feature vectors for each of the input training images 610. The context-aware image selection system 400 then provides the generated feature vector to the higher neural network layers 604, which compares the generated feature vector from the lower neural network layers 602 to feature vectors of images with known high-quality attributes based on attribute-quality classification parameters. Based on the feature vector comparison, the higher neural network layers 604 employ the attribute-quality classification parameters to generate an attribute-quality probability vector, which indicates a correspondence between the input training image to feature vectors of images with known high-quality attributes.

Next, the context-aware image selection system 400 provides the attribute-quality probability vector to the attribute-quality classification loss model 608. The attribute-quality classification loss model 608 compares the identified attribute-quality indicated in the attribute-quality probability vector to the known feature vectors of images with high quality attributes to determine an amount of attribute-quality classification error loss (or simply "error loss"). Indeed, the context-aware image selection system 400 can provide the attribute-quality probability vector to the attribute-quality classification loss model 608 to determine the accuracy and/or error loss of the attribute-quality classification. In some embodiments, the attribute-quality classification loss model 608 employs a softmax cross-entropy loss attribute-quality classifier, and/or mean square error computations to determine the amount of attribute-quality classification loss. For instance, the attribute-quality classification loss model 608 identifies when an attribute-quality probability vector is beyond a threshold distance, and/or how far beyond the threshold distance (e.g., error loss) the attribute-quality probability vector from a feature vector for an image of known high quality.

Then, using the error loss to train and optimize the neural network layers of the attribute-quality classification neural network 600, the context-aware image selection system 400 can employ back propagation and end-to-end learning to tune feature extraction parameters within layers of the attribute-quality classification neural network 600. For instance, in one or more embodiments, the context-aware image selection system 400 takes the error loss output from the attribute-quality classification loss model 608 and provides it back to the lower neural network layers 602 and/or the higher neural network layers 604 until the error loss from the attribute-quality classification loss model 608 is minimized. In particular, the attribute-quality classification loss model 608 provides feedback to the lower neural network layers 602 to further tune the attribute-quality feature extraction parameters and/or the higher neural network layers 604 to further tune the attribute-quality classification parameters. In this manner, the context-aware image selection system 400 iteratively trains the attribute-quality classification neural network 600 to learn a set of best-fit parameters that extract attribute-quality features from an image and accurately classify a corresponding attribute-quality.

As mentioned above, in some embodiments, the context-aware image selection system 400 employs the higher neural network layers 604 to determine an attribute-quality probability vector of an input attribute-quality of an input image. As an example of an attribute-quality probability vector, the higher neural network layers 604 outputs a 2-dimensional attribute-quality probability vector with entries ranging between zero and one (i.e., [0-1]). The first entry can be the probability that an input image has a high-quality attribute therein. The second entry in the attribute-quality probability vector can be a probability that the input image has a low-quality attribute therein. The context-aware image selection system 400 can use the first entry as the attribute quality score.

When generating and training a face-quality classification neural network, the context-aware image selection system 400 can use training images comprising faces with a label as low quality or high quality. In one or more embodiments, low quality faces are faces that have motion blur, are out of focus, have bad illumination or exposure, faces that are occluded (i.e., covered or not entirely in the image), faces with one or more eyes closed, faces with low contrast or that are hazy, faces with heavy image compression, faces with an undesired expression, or ugly faces. In one or more embodiments, the context-aware image selection system 400 warps faces to a fixed size for feature learning and classifier training. To apply a trained face-quality classification neural network, the face-quality classification neural network can employ a face detection algorithm to locate faces in each image. The face-quality classification neural network can then conduct a weighted average on all face quality scores based on a spatial face map, which encodes a number of faces, sizes of faces, locations of faces, and the face quality scores.

The context-aware image selection system 400 can similarly train an aesthetic-quality classification neural network and an image-quality classification neural network. For example, the context-aware image selection system 400 can train an image-quality classification neural network to classify images having sharpness, high resolution, and good exposure as high quality and images having bad lighting, blur, and noise as low quality. Similarly, an image-quality classification neural network can train an aesthetic-quality classification neural network or a classification neural network for any desired attribute.

Figure 6B:
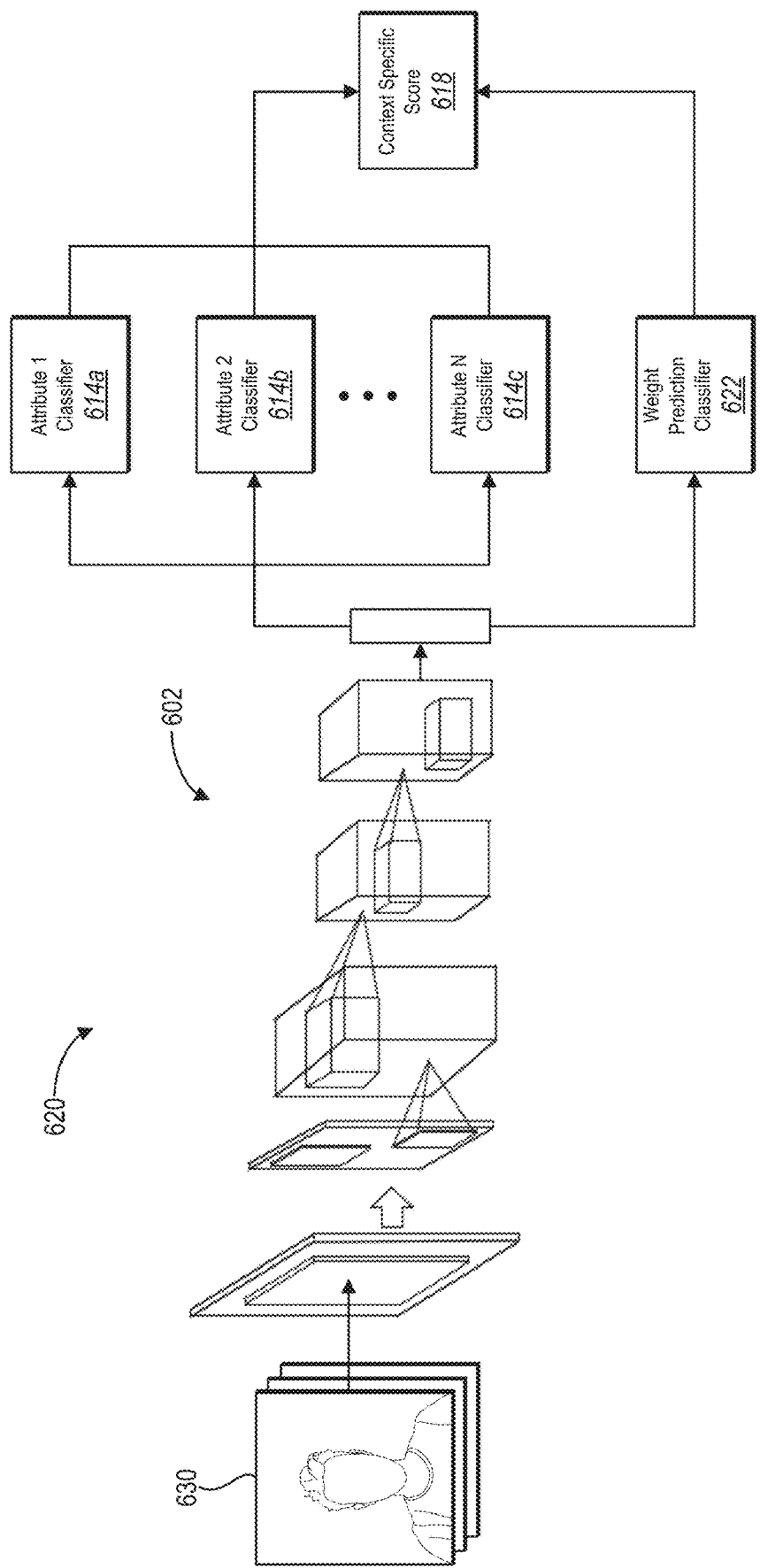
FIG. 6B illustrates an example neural network for generating a context-specific score in accordance with one or more embodiments

Upon training attribute-quality classification neural networks, the context-aware image selection system 400 can refine the attribute-quality classification neural networks and train a weight prediction classifier 622 by generating a context-specific classification neural network 620 as shown in FIG. 6B. In particular, the context-aware image selection system 400 can generate the context-specific classification neural network 620 by combing the higher neural network layers (e.g., attribute classifiers 614a-614c) and a weight prediction classifier 622. FIG. 6B shows that the context-specific classification neural network 620 shares the lower neural network layers 602 (i.e., the feature encoder). In alternative embodiments, each classifier can have a separate feature encoder.

In particular, the context-aware image selection system 400 fine-tunes the attribute classifiers 614a-614c while training the weight prediction classifier 622 from scratch. As detailed below, the context-aware image selection system 400 can simultaneously train the attribute classifiers 614a-614c and the weight prediction classifier 622 with a single font classification loss model.

When trained, the context-specific classification neural network 620 provides improved context-specific scoring of images. For example, upon receiving an input image, the context-specific classification neural network 620 provides the image to the feature encoder (i.e., lower neural network layers 602), which generate a feature vector for the image. The context-specific classification neural network 620 then provides the feature vector to each of the attribute classifiers 614a-614c and the weight prediction classifier 622. The attribute classifiers 614a-614c each output an attribute quality score as describe above in relation to FIG. 6A for the input image.

In addition, the weight prediction classifier 622 outputs a multi-dimensional prediction vector that includes a weight classification prediction (e.g., weight or w) for each attribute having a corresponding attribute classifier 614a-614c. The individual weight classification predictions indicate how to combine the attribute-quality scores output from the attribute classifiers 614a-614c to best score an image according to a given context (i.e., generate an accurate context-specific score 618). In particular, to generate a context-specific score 618, the context-specific classification neural network 620 weights the attribute quality scores output from the attribute classifiers 614a-614c by a corresponding weight output from the weight prediction classifier 622 and then sums the weight-adjusted attribute quality scores to generate the context-specific score 618.

The context-aware image selection system 400 can train the context-specific classification neural network 620 using the initially trained attribute-quality classification neural networks (e.g., the attribute classifiers 614a-614c trained as described above in relation to FIG. 6A). For example, the context-aware image selection system 400 provides an image 630 to the feature encoder (i.e., lower neural network layers 602) which generate a feature vector for the image. The context-specific classification neural network 620 then provides the feature vector to each of the attribute classifiers 614a-614c and the weight prediction classifier. The attribute classifiers 614a-614c each output an attribute quality score for the input image. In various embodiments, the weight prediction classifier 610 initially assigns random values or predetermined values (e.g., 20/75/5) as weights. As training continues, the weight prediction classifier 610 learns to more accurately predict weights for a given image.

To train the context-specific classification neural network 620, the context-aware image selection system 400 provides the context-specific score 618 to a context-specific classification loss model. The context-specific classification loss model operates in a similar manner to the attribute classification loss models described above. The context-specific classification loss minimized by the context-specific classification loss model is a mixture of weighted error loss from the output of the attributes classifiers 614*a*-614*c* (where the assigned weights either minimize or exaggerate the error loss depending on the accuracy of the weighted predictions).

The context-aware image selection system 400 provides feedback to the context-specific classification neural network 620. For instance, the context-specific classification loss model provides feedback to the attribute classifiers 614*a*-614*c* and the weight prediction classifier 622. In some embodiments, the context-aware image selection system 400 provides feedback to each classifier using the same learning rate.

In alternative embodiments, the context-aware image selection system 400 provides feedback to each classifier using different learning rates. For example, because the attribute classifiers 614*a*-614*c* have previously been trained, the context-aware image selection system 400 provides the error loss at a small learning rate, which fine-tunes the parameters of the attribute classifiers 614*a*-614*c*. Further, because the weight prediction classifier 622 is being trained for the first time, the context-aware image selection system 400 provides the error loss at a large learning rate to the weight prediction classifier during training, which more quickly tunes the weight prediction parameters to better predict the weights. Indeed, the weight prediction classifier 622 automatically learns weight classification parameters that are well-suited to making accurate predictions regarding how to combine the attribute quality scores.

The context-aware image selection system 400 can iteratively repeat the overall feedback and optimization cycle until the context-specific classification neural network 620 is trained. For instance, the context-specific classification neural network 620 continues to feed the images 630 and optimize the layers of the context-specific classification neural network 620 until the neural network converges. In particular, the context-aware image selection system 400 trains the weight prediction classifier 622 by slowly reducing the learning rate as the weight prediction classifier 622 increases in prediction accuracy. The context-aware image selection system 400 can conclude training when the overall cross-entropy classification error loss at the context-specific classification loss model is minimized, and/or the context-specific classification neural network 620 stabilizes. In one or more embodiment, the foregoing disclosure in relation to FIG. 6B and algorithm (1), and the corresponding disclosure, can comprise the structure for performing a step for generating a plurality of context-specific scores for each of the plurality of images.

Figure 7:
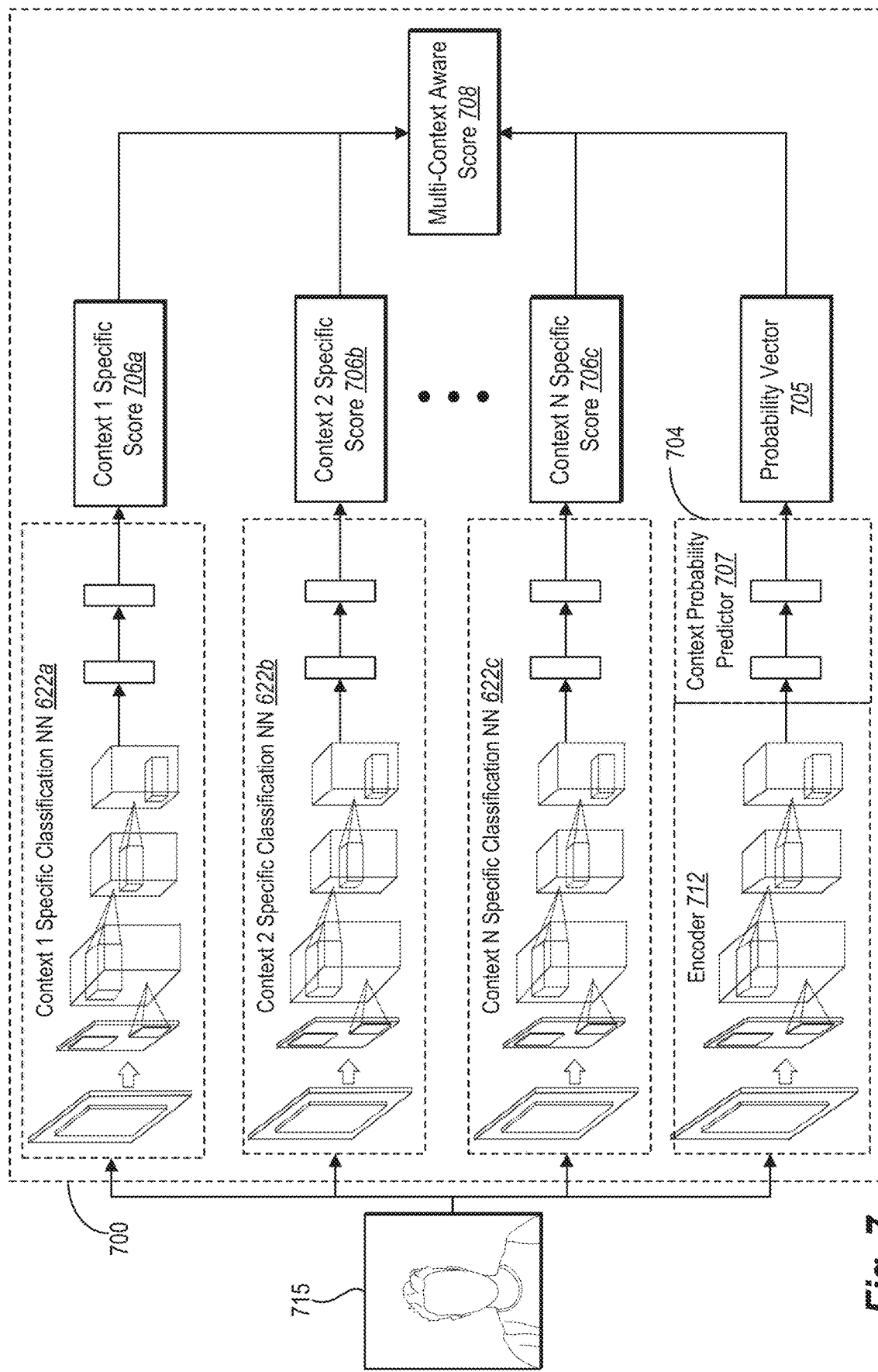
FIG. 7 illustrates and example neural network for generating a multi-context aware rating in accordance with one or more embodiments.

Once the context-aware image selection system 400 has trained various context-specific classification neural networks, the context-specific classification neural network can use the trained context-specific classification neural networks to generate multi-context aware scores. For example, FIG. 7 illustrates a neural-network based multi-context aware rating generator 700. The neural-network based multi-context aware rating generator 700 can comprise a plurality of trained context-specific classification neural networks 622*a*-622*c* trained to output different context-specific scores 706-706*c*. The neural-network based multi-context aware rating generator 700 can further include a context probability predictor neural network 704. The context probability predictor neural network 704 can comprise a neural network trained using methods similar to those described above. Specifically, the context probability predictor neural network 704 can comprise a neural network trained to, given an input image, output a context probability vector 705. The context probability vector 705 can comprise a probability that an input image has each of a plurality of contexts.

To train the context probability predictor neural network 704, the context-aware image selection system 400 can use supervised training images that include context labels. The context-aware image selection system 400 can provide the supervised training images to a feature encoder 712 (which can comprise the feature encoder 622 or another feature encoder). The feature encoder 712 can generate a feature vector. The context probability predicator 707 can then generate a context probability score for each context based on the feature vector. In one or more embodiments, the context probability predicator 707 is a softmax classifier that allows an image to have a non-zero probability for multiple different contexts. The context-aware image selection system 400 can use a classification loss model (as described above) to employ back propagation and end-to-end learning to tune feature extraction parameters within layers of the context probability predictor neural network 704. For instance, in one or more embodiments, the context-aware image selection system 400 takes the error loss output from the classification loss model and provides it back to the lower neural network layers, and/or the higher neural network layers of the context probability predictor neural network 704, until the error loss from the classification loss model 608 is minimized. Once trained, the neural-network based multi-context aware rating generator 700 can receive an image 715 and input, generate context-specific scores 706*a*-706*c*, and adjust the context-specific scores 706*a*-706*c* by a corresponding context probability output from the context probability predictor neural network 704 to generate a multi-context aware score 708. In one or more embodiments, the foregoing disclosure in relation to FIG. 7, and algorithms (2) and (3) and the corresponding disclosure, can comprise the structure for performing a step for generating a multi-context aware rating utilizing the plurality of context probability scores and the plurality of context-specific scores for each of the plurality of images.

Figure 8:
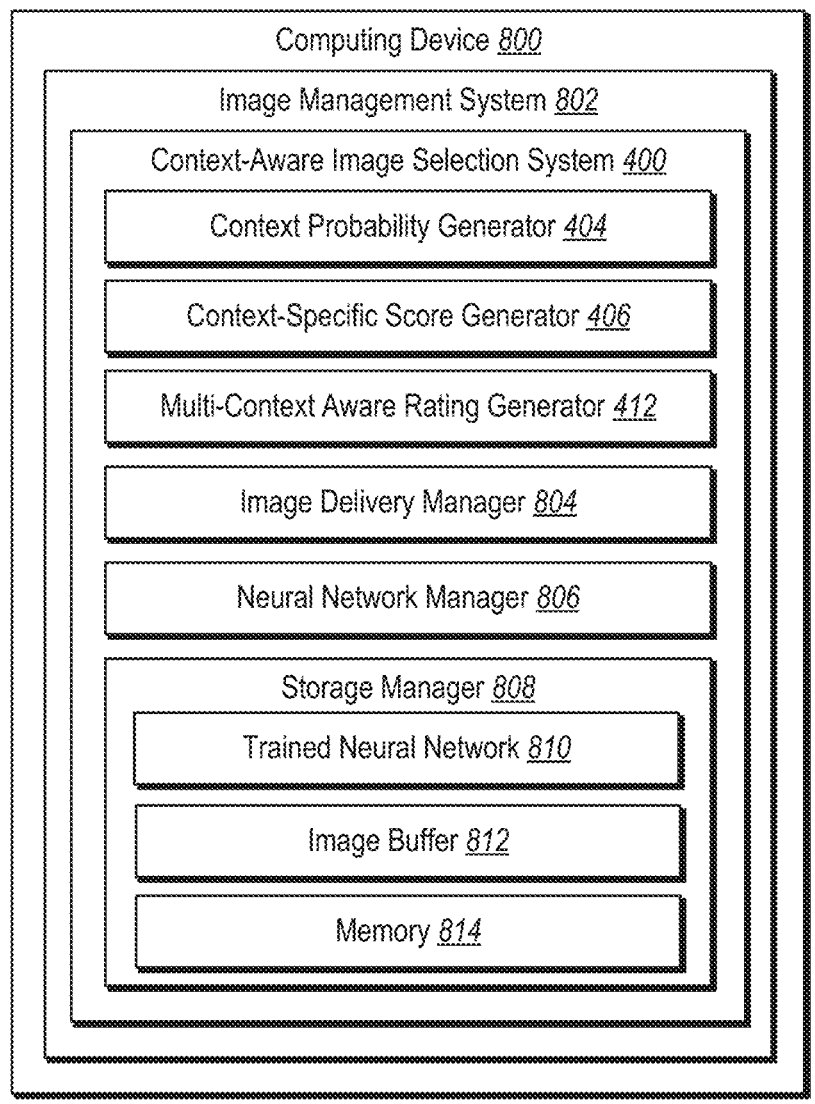
FIG. 8 illustrates a schematic diagram of a context-aware image selection system in accordance with one or more embodiments.

Turning now to FIG. 8, additional detail will be provided regarding components and functionality of the context-aware image selection system 400 in accordance with one or more embodiments. In particular, FIG. 8 illustrates a computing device 800 implementing an image management system 802. The image management system 802 can include the context-aware image selection system 400. The context-aware image selection system 400 can include the context probability generator 404, the context-specific score generator 406, the multi-context aware rating generator 412, an image delivery manager 804, and a neural network manager 806. The context-aware image selection system 400 can also include a storage manager 808, which may include the trained neural network 810, an image buffer 812, and memory 814.

As just mentioned, the computing device 800 can include the image management system 802. The image management system 802 can access, identify, modify, revise, and/or provide digital visual media (such as images and videos). For example, the image management system 802 can comprise an application that allows for capturing, editing, and/or sharing digital images or videos. For example, the image management system 802 can aid users in capture, editing (adding filters, masks, frames, etc.), and sharing digital images (e.g., via a social network or uploading to a cloud based repository). In one or more embodiments, the image management system 802 can comprise a digital image editing application or digital image capturing application, including but not limited to ADOBE® PHOTOSHOP®, ADOBE® LIGHTROOM®, or ADOBE® PREMIERE®. "ADOBE," "PHOTOSHOP," "LIGHTROOM," and "PREMIERE" are either registered trademarks or trademarks of Adobe Systems Incorporated in the United States and/or other countries. In any event, the image management system 802 can implement the context-aware image selection system 400.

The context-aware image selection system 400 can include a plurality of components as described above. Utilizing the plurality of components, the context-aware image selection system 400 can select an image from a plurality of images, as described in detail above. By way of example, the context-aware image selection system 400 can select an image from the plurality of images in a burst of images based at least on the image having a higher multi-context aware rating than the other plurality of images in the burst. In other embodiments, the context-aware image selection system 400 can select a high-quality image from any plurality of images whether burst mode images or not. For example, the context-aware image selection system 400 can provide/select a high-quality image from any group of images (e.g., can select a high-quality image and use the high-quality image as a thumbnail to represent the group of images).

The context probability generator 404 can generate one or more context probabilities scores for an image, as described above. For example, the context probability generator 404 can comprise a neural network having a context probability predictor or classifier trained to return a context probability vector.

The context-aware image selection system 400 further includes the context-specific score generator 406. The context-specific score generator 406 generates a context-specific score for an image, as described in detail above. For example, using one or more weight-adjusted attribute-quality scores associated with an image, the context-specific score generator 406 can generate a context-specific score for a context in relation to the image. In one or more embodiments, the context-specific score generator 406 comprises a neural network, as described above or as described in U.S. Pat. No. 9,613,058, the entire contents of which is hereby incorporated by reference.

Utilizing both the score from the context probability generator 404, and the score from the context-specific score generator for each image and each context, the context-aware image selection system 400 can generate a multi-context aware rating for each image. Specifically, utilizing the multi-context aware rating generator 412, the context-aware image selection system 400 can generate a multi-context aware rating for an image as described above.

After generating the multi-context aware ratings for each of the plurality of images in a burst of images, the context-aware image selection system 400 can select an image. In particular, the context-aware image selection system 400 can select the image with the highest multi-context aware rating from among the plurality of images in the burst to deliver via the image delivery manager 804.

In addition to the above-mentioned components, the context-aware image selection system 400 may include the neural network manager 806. The neural network manager 806 can provide, manage, train, and/or control a neural network(s), as described above. For example, the neural network manager 806 applies a trained neural network to digital images.

The context-aware image selection system 400 also includes the storage manager 808. Specifically, the storage manager 808 can maintain data of any type, size, or kind, as necessary to perform the functions of the context-aware image selection system 400. Although not illustrated, the storage manager 808 can maintain other data including an attribute-quality scores, an attribute quality weights value, or other information discussed herein.

Moreover, the storage manager 808 can provide, manage, and/or control the trained neural network 810, the image buffer 812, and the memory 814. For example, the storage manager 808 determines when to store the plurality of images from the burst of images in the image buffer 812, and when to delete the plurality of images from the image buffer 812. Moreover, the storage manager 808 maintains the trained neural networks, including updating the trained neural network 810 as directed by the context-aware image selection system 400. Additionally, the storage manager 808 controls interaction with the client device memory 814 (e.g., directing where in the client device memory to store a selected image provided by the context-aware image selection system 400).

Each of the components 400, 404, 406, 412, and 800-814 ("the plurality of components") of the context-aware image selection system 400 and their corresponding elements may be in communication with one another using any suitable communication technologies. It will be recognized that although the plurality of components and their corresponding elements are shown to be separate in FIG. 8, any of the plurality of components and their corresponding elements may be combined into fewer components, such as into a single facility or module, divided into more components, or configured into different components as may serve a particular embodiment.

The plurality of components and their corresponding elements can comprise software, hardware, or both. For example, the plurality of components and their corresponding elements can comprise one or more instructions stored on a computer-readable storage medium and executable by processors of one or more computing devices. The plurality of components and their corresponding elements can comprise hardware, such as a special purpose processing device to perform a certain function or group of functions. Additionally, or alternatively, the plurality of components and their corresponding elements can comprise a combination of computer-executable instructions and hardware.

Furthermore, the plurality of components of the context-aware image selection system 400 may, for example, be implemented as one or more stand-alone applications, as one or more modules of an application, as one or more plug-ins, as one or more library functions or functions that may be called by other applications, and/or as a cloud-computing model. Thus, the plurality of components of the context-aware image selection system 400 may be implemented as a stand-alone application, such as a desktop or mobile application. Furthermore, the plurality of components of the context-aware image selection system 400 may be implemented as one or more web-based applications hosted on a remote server. Alternatively, or additionally, the components of the context-aware image selection system 400 may be implemented in a suit of mobile device applications or "apps."

Figure 9:
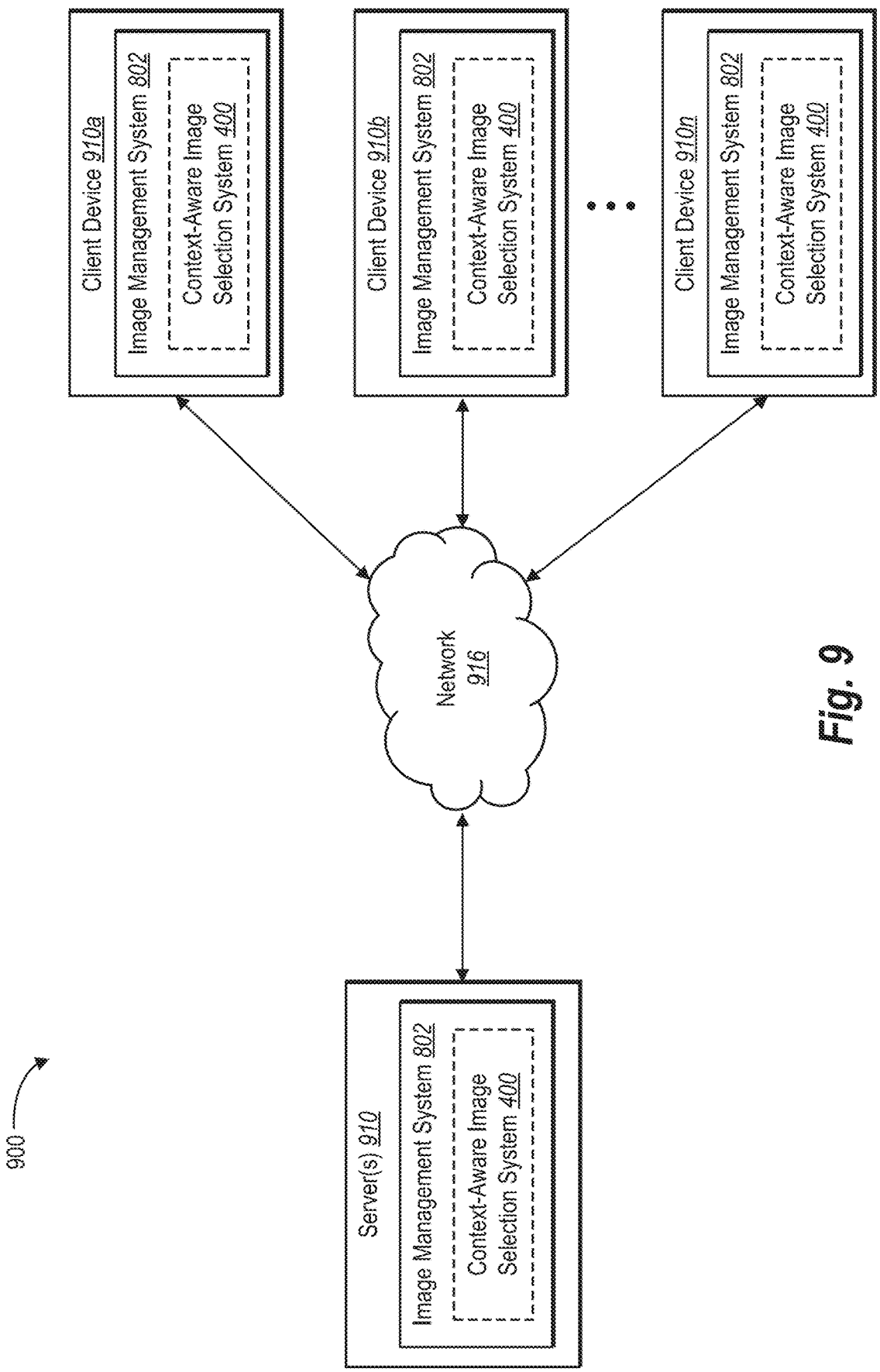
FIG. 9 illustrates a schematic diagram of a network environment in which a context-aware image selection system can be implemented in accordance with one or more embodiments.

The plurality of components described above for operating the context-aware image selectin system 400 may be implemented in a system environment. Specifically, FIG. 9 illustrates a schematic diagram of one embodiment of an exemplary system environment ("environment") 900 in which a context-aware image selection system 400 can operate. As illustrated in FIG. 9, the environment 900 can include a server(s) 910, a network 916, and a plurality of client devices 910*a*-910*n*. The server(s) 910, the network 916, the plurality of client devices 910*a*-910*n*, and the other components of the environment 900 may be communicatively coupled with each other either directly or indirectly (e.g., through the network 916).

As illustrated in FIG. 9, the environment 900 can include the server(s) 910. The server(s) 910 may generate, store, receive, and/or transmit any type of data. The server(s) 910 can comprise a communication server or a web-hosting server. In one or more embodiments, the server(s) 910 may comprise a data server.

Moreover, as illustrated in FIG. 9, the environment 900 can include the plurality of client devices 910*a*-910*n*. The plurality of client devices 910*a*-910*n* may comprise a variety of different computing devices, such as personal computers, laptop computers, mobile devices, smartphones, tablets, special purpose computers, TVs, or other computing devices. As illustrated in FIG. 9, the plurality of client devices 910*a*-910*n*, and/or the server(s) 910 may communicate via the network 916.

As illustrated, the image management system 802, and the context-aware image selection system 400 can be implemented by a variety of components in the environment 900. Specifically, the image management system 802, and the context-aware image selection system 400, may be implemented in whole or in part via the server(s) 910, and/or the plurality of client devices 910*a*-910*n*. For example, the server(s) 910 can host the neural networks utilized to compute the plurality of context probability scores, and the plurality of context-specific scores, while the plurality of client devices 910*a*-910*n* can implement the multi-context aware scoring process. When implemented in part on the server(s) 910, and in part on the plurality of client devices 910*a*-910*n*, the image management system 802, and the context-aware image selection system 400 are communicatively coupled (i.e., via the network 916).

The image management system 802 can manage the context-aware image selection system 400. For instance, the image management system 802 can activate the context-aware image selection system 400, send and receive requests to/from the context-aware image selection system 400, and provide the selected image received from the context-aware image selection system 400 to the client device 100.

Moreover, the context-aware image selection system 400 can operate as described above in relation to FIGS. 1-8. Specifically, the context-aware image selection system 400 can generate a plurality of context probability scores for each of a plurality of images. Furthermore, the context-aware image selection system 400 can generate a plurality of context-specific scores for each of the plurality of images. Additionally, the context-aware image selection system 400 may generate a multi-context aware rating utilizing the plurality of context probability scores and the plurality of context-specific scores for each of the plurality of images. Thereafter, the context-aware image selection system 400 can select an image from the plurality of images with the highest multi-context aware rating.

Although FIG. 9 illustrates a single server(s) 910, it will be appreciated that the server(s) 910 can represent any number of server computing devices. Similarly, although FIG. 9 illustrates a particular arrangement of the server(s) 910, network 916, and the plurality of client devices 910*a*-910*n*, various additional arrangements are possible.

Figure 10:
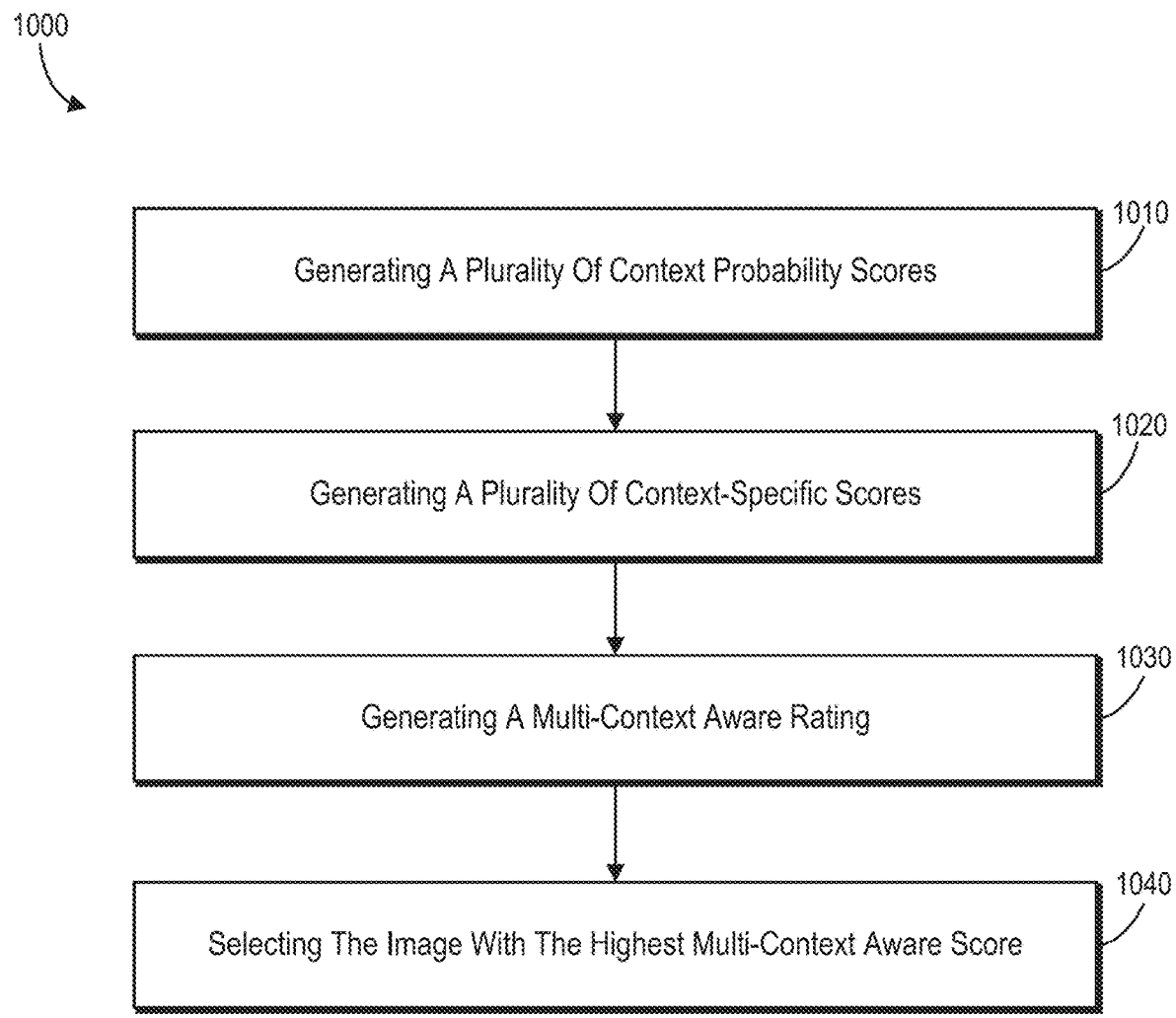
FIG. 10 illustrates a flowchart of a series of acts for automatic context-aware image selection in accordance with one or more embodiments.

FIGS. 1-9, the corresponding text, and the examples, provide a number of different systems and devices that allows a user to facilitate selection of a "high-quality" image. In addition to the foregoing, embodiments can also be described in terms of a series of acts for accomplishing a particular result. For example, FIG. 10 illustrates a flowchart of a series of acts 1000 for automatic context-aware image selection in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10.

As illustrated in FIG. 10, the series of acts 1000 can comprise an act 1010 of generating a plurality of context probability scores. For example, act 1010 can comprise generating a plurality of context probability scores for each image of a plurality of images. Additionally, act 1010 can comprise generating the plurality of context probability scores for each image of the plurality of images by estimating a probability that each image comprises each of a plurality of contexts. Moreover, the act 1010 may comprise generating the plurality of context probability scores for each image of the plurality of images by estimating the probability that each image comprises each of the plurality of contexts by employing a neural network comprising a context probability predictor trained to return a probability for each of the plurality of contexts. Indeed, the context probability predictor may comprise a softmax classifier that allows an image to have a non-zero probability for multiple different contexts.

As mentioned above, FIG. 10 further shows the act 1020 of generating a plurality of context-specific scores. In particular, the act 1020 may comprise generating a plurality of context-specific scores for each image of a plurality of images. For example, generating a plurality of context-specific scores can comprise generating one or more of a selfie context, a group portrait context, or a scenery context.

Additionally, act 1020 can comprise generating a plurality of attribute-quality scores for each image of the plurality of images. Generating a plurality of attribute-quality scores can comprise generating a rating for an image attribute. By way of example, the attribute-quality scores can comprise a face quality score and an overall quality score. Moreover, act 1020 can comprise generating the plurality of attribute-quality scores using one or more neural networks having a classifier trained to rate each image attribute. Still further, act 1020 can comprise generating the plurality of attribute-quality scores for each image of the plurality of images by generating a score between zero and one.

Furthermore, act 1020 can comprise generating the plurality of context-specific scores for each of the plurality of images by uniquely combining, for each context, the plurality of attribute-quality scores. For example, act 1020 can comprise combining, for each context, the plurality of attribute-quality scores using a combination of weights specific to each context. In particular, act 1020 can comprise combining the attribute-quality scores using a combination of weights, wherein the combination of weights differs for each context. Act 1020 can also comprise learning the weights for combining attribute-quality scores used to generate the plurality of context-specific scores.

Act 1020 may comprise further determining a face quality score for each face in each image of the plurality of images. Act 1020 can also comprise determining a maximum face quality score for each face from among the face quality scores for the face. Act 1020 can also comprise generating a face quality score differential for each face in each image by determining a difference between each face quality score and the maximum face quality score for a given face. Then, act 1020 may comprise generating a combined face quality score for each image by summing the face quality score differentials for each face included in a given image. Act 1020 can further comprise weighting each face quality score by a ratio of a surface area of the face to a total surface area of all faces in the image.

As mentioned above, FIG. 10 also illustrates an act 1030 of generating a multi-context aware rating. For example, act 1030 can comprise generating, for each image of the plurality of images, a multi-context aware rating utilizing the plurality of context probability scores and the plurality of context-specific scores. In particular, act 1030 can comprise adjusting each context-specific score based on a corresponding context probability score of the plurality of context probability scores, and summing the adjusted context-specific scores.

The series of acts 1000 can further include the act 1040 of selecting an image with the highest multi-context aware rating. For example, the act 1040 can comprise selecting an image from the plurality of images with the highest multi-context aware rating. In one or more embodiments act 1040 comprises automatically surfacing the image in a user interface with controls for editing or sharing digital images.

The series of acts 1000 can further comprise capturing a plurality of images using a burst mode, a live photo mode, or a video mode. The series of acts 1000 can comprise storing the plurality of images in a buffer of the computing device upon capturing the plurality of images. The series of acts 1000 can further comprise upon selection of the image from the plurality of images: highlighting the selected image from among the plurality of images, or using the selected image as a cover photo for a live photo/video.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
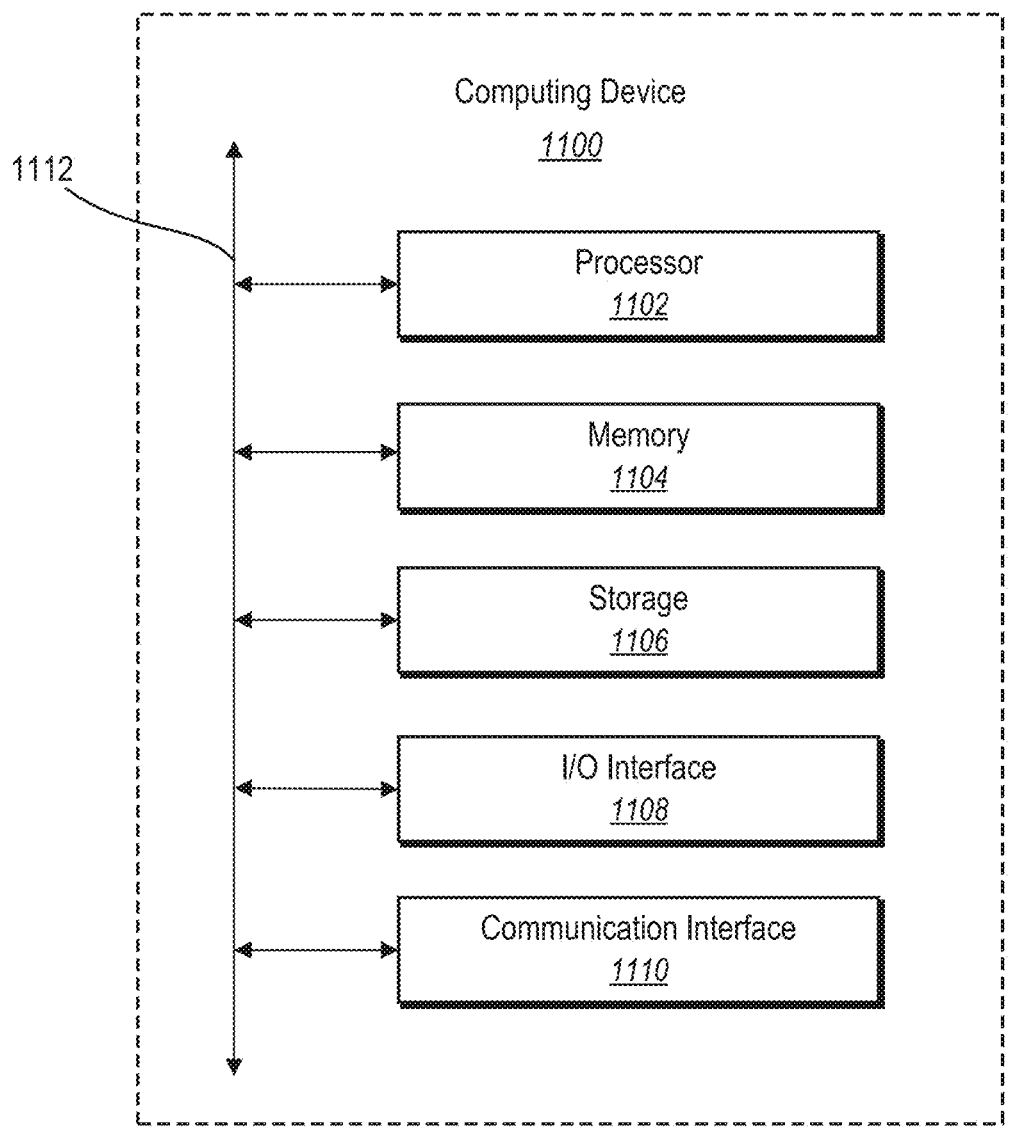
FIG. 11 illustrates a block diagram of an exemplary computing device in accordance with one or more embodiments.

FIG. 11 illustrates a block diagram of an exemplary computing device 1100 that may be configured to perform one or more of the processes described above. One will appreciate that one or more computing devices such as the computing device 1100 may implement one or more components of the context-aware image selection system 400. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In one or more embodiments, the processor 1102 includes hardware for executing instructions, such as those making up a computer program. As an example and not by way of limitation, to execute instructions, the processor 1102 may retrieve (or fetch) the instructions from an internal register, an internal cache, the memory 1104, or the storage device 1106 and decode and execute them. In one or more embodiments, the processor 1102 may include one or more internal caches for data, instructions, or addresses. As an example and not by way of limitation, the processor 1102 may include one or more instruction caches, one or more data caches, and one or more translation lookaside buffers (TLBs). Instructions in the instruction caches may be copies of instructions in the memory 1104 or the storage device 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1104 may be internal or distributed memory.

The storage device 1106 includes storage for storing data or instructions. As an example and not by way of limitation, storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. The storage device 1106 may include removable or non-removable (or fixed) media, where appropriate. The storage device 1106 may be internal or external to the computing device 1100. In one or more embodiments, the storage device 1106 is non-volatile, solid-state memory. In other embodiments, the storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 may facilitate communications across various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A non-transitory computer readable medium operable to perform automatic context-aware image selection by storing instructions thereon that, when executed by at least one processor, cause a computing device to:

generate a plurality of context probability scores for each image of a plurality of images by determining a probability that each image comprises each of a plurality of contexts;

generate a plurality of context-specific scores for each image of the plurality of images, wherein each context-specific score quantifies one or more image qualities using factors specific to a given context of the plurality of contexts;

generate, for each image of the plurality of images, a multi-context aware rating utilizing the plurality of context probability scores and the plurality of context specific scores; and select an image from the plurality of images with the highest multi-context aware rating.

2. The non-transitory computer readable medium of claim 1, wherein the instructions, when executed by the at least one processor, cause the computing device to generate each context-specific score by:

generating a plurality of attribute-quality scores; and
combining the attribute-quality scores using a combination of weights, wherein the combination of weights differs for each context.

3. The non-transitory computer readable medium of claim 2, wherein generating the plurality of attribute-quality scores the attribute-quality scores comprises generating a face quality score and an overall quality score.

4. The non-transitory computer readable medium of claim 3, wherein the instructions, when executed by the at least one processor, further cause the computing device to determine a combined face quality score for a group portrait context by:

determining a face quality score for each face in each image of the plurality of images;

determining a maximum face quality score for each face from among the face quality scores for the face;

generating a face quality score differential for each face in each image by determining a difference between each face quality score and the maximum face quality score for a given face; and generating a combined face quality score for each image by summing the face quality score differentials for each face included in a given image.

5. The non-transitory computer readable medium of claim 1, wherein the instructions, when executed by the at least one processor, cause the computing device to generate the multi-context aware rating by:

adjusting each context-aware score based on a corresponding context probability score of the plurality of context probability scores; and summing the adjusted context-aware scores.

6. The non-transitory computer readable medium of claim 1, wherein the instructions, when executed by the at least one processor, cause the computing device to generate the plurality of context-specific scores for each image of the plurality of images by generating one or more of selfie context-specific score, a group portrait context-specific score, or a landscape context-specific score.

7. The non-transitory computer readable medium of claim 1, wherein the instructions, when executed by the at least one processor, cause the computing device to:

capture the plurality of images using a burst mode, a live photo mode, or a video mode;

store the plurality of images in a buffer of the computing device upon capturing the plurality of images; and upon selection of the image from the plurality of images:

highlight the selected image from among the plurality of images; or use the selected image as a cover photo for a live photo or video.

8. The non-transitory computer readable medium of claim 7, wherein the instructions, when executed by the at least one processor, cause the computing device to automatically surface the image in a user interface with controls for editing or sharing digital images.

9. The non-transitory computer readable medium of claim 1, wherein the instructions, when executed by the at least one processor, further cause the computing device to estimate the probability that each image comprises each of a plurality of contexts by employing a neural network comprising a context probability predictor trained to return a probability for each of the plurality of contexts.

10. A system operable to perform automatic context aware image selection, the system comprising:

memory comprising:
a plurality of images; and
a plurality of weights;

at least one processor; and a computer readable storage medium storing instructions that, when executed by the at least one processor, cause the system to:

generate a plurality of context probability scores for each image of a plurality of images by estimating a probability that each image comprises each of a plurality of contexts;

generate a plurality of attribute-quality scores for each image of the plurality of images, each attribute quality score comprising a rating for an image attribute;

generate a plurality of context-specific scores for each image of the plurality of images by uniquely combining, for each context, the plurality of attribute quality scores;

generate a multi-context aware rating by:
adjusting each context-aware score by a corresponding context probability score of the plurality of context probability scores; and summing the adjusted context-aware scores; and select an image from the plurality of images with the highest multi-context aware rating.

11. The system of claim 10, wherein the instructions, when executed by the at least one processor, cause the system to generate the plurality of attribute-quality scores for each image of the plurality of images using one or more neural networks having a classifier trained to rate each image attribute.

12. The system of claim 11, wherein the instructions, when executed by the at least one processor, cause the system to generate the plurality of context-specific scores for each image of the plurality of images by uniquely combining, for each context, the plurality of attribute-quality scores using a combination of weights specific to each context.

13. The system of claim 12, wherein the instructions, when executed by the at least one processor, further cause the system to learn the combination of weights for each context during training of the one or more neural networks.

14. The system of claim 10, wherein the instructions, when executed by the at least one processor, cause the system to generate the plurality of attribute-quality scores for each image of the plurality of images by generating a score between zero and one.

15. The system of claim 10, wherein the instructions, when executed by the at least one processor, cause the system to generate the plurality of context probability scores for each image of the plurality of images by estimating the probability that each image comprises each of the plurality of contexts by employing a neural network comprising a context probability predictor trained to return a probability for each of the plurality of contexts.

16. The system as recited in claim 15, wherein the context probability predictor comprises a softmax classifier that allows an image to have a non-zero probability for multiple different contexts.

17. The system of claim 10, wherein the instructions, when executed by the at least one processor, cause the system to:

capture the plurality of images using a burst mode, a live photo mode, or a video mode;

store the plurality of images in a buffer of a computing device upon capturing the plurality of images; and upon selection of the image from the plurality of images:
highlight the selected image from among the plurality of images; or
use the selected image as a cover photo for a live photo or video.

18. In a digital media environment, for capturing and manipulating digital images, a method of automatic context-aware image selection comprising:

generating a plurality of context probability scores for each of a plurality of images;

performing a step for generating a plurality of context specific scores for each of the plurality of images;

performing a step for generating a multi-context aware rating utilizing the plurality of context probability scores and the plurality of context-specific scores for each of the plurality of images; and selecting an image from the plurality of images with the highest multi-context aware rating.

19. The method of claim 18, wherein generating the plurality of context probability scores for each of the plurality of images comprises employing a neural network comprising a context probability predictor trained to return a probability for each of the plurality of contexts.

20. The method of claim 18, wherein performing the step for generating the plurality of context-specific scores for each of the plurality of images comprises learning weights for combining attribute-quality scores used to generate the plurality of context-specific scores.

* * * * *